(12) United States Patent
O'Kane et al.

(10) Patent No.: US 12,163,060 B2
(45) Date of Patent: Dec. 10, 2024

(54) FAST CURING EPOXY ACRYLIC LIQUID SHIM

(71) Applicants: Henkel IP & Holding GmbH, Düsseldorf (DE); Henkel AG & Co. KGaA, Duesseldorf (DE)

(72) Inventors: Ruairi O'Kane, Oakland, CA (US); Li Li, Oakland, CA (US); Adam Meng, Campbell, CA (US); William F. Torres, Suisun City, CA (US); Nicholas O. Dominguez, Oakley, CA (US); Martin Renkel, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 720 days.

(21) Appl. No.: 17/150,939

(22) Filed: Jan. 15, 2021

(65) Prior Publication Data
US 2021/0284881 A1    Sep. 16, 2021

Related U.S. Application Data

(63) Continuation of application No. PCT/US2019/042520, filed on Jul. 19, 2019.
(Continued)

(51) Int. Cl.
*C09J 163/00* (2006.01)
*C08F 2/50* (2006.01)
(Continued)

(52) U.S. Cl.
CPC .............. *C09J 163/00* (2013.01); *C08F 2/50* (2013.01); *C08F 220/06* (2013.01); *C08K 3/013* (2018.01)

(58) Field of Classification Search
CPC . C09J 163/00; C09J 4/00; C09J 133/08; C09J 11/00; C09J 133/10; C09J 2433/00;
(Continued)

(56) References Cited

U.S. PATENT DOCUMENTS

| | | | | |
|---|---|---|---|---|
| 3,684,617 A | * | 8/1972 | Windecker | C09J 163/00 156/332 |
| 4,426,243 A | * | 1/1984 | Briggs | C09J 163/10 528/106 |

(Continued)

FOREIGN PATENT DOCUMENTS

| | | |
|---|---|---|
| CN | 103694905 A | 4/2014 |
| CN | 103958628 A | 7/2014 |

(Continued)

OTHER PUBLICATIONS

Cab-O-Sil (R) TS-610 Treated Fumed Silica Data Sheet, Cabot Corp. (Year: 2006).*

(Continued)

*Primary Examiner* — Cynthia L Schaller
(74) *Attorney, Agent, or Firm* — Steven C. Bauman

(57) ABSTRACT

The present disclosure provides two part, room-temperature curable hybrid epoxy/(meth)acrylate compositions, comprising: (a) a first component, comprising (meth)acrylate monomers, crosslinkers, epoxy curatives, and optional free radical accelerator, tougheners, fillers and additives, and inhibitors; and (b) a second component, comprising epoxy resins, methacrylate free radical initiators, and optional tougheners, fillers and additives. The compositions provide among other advantageous properties fast cure rate, extremely high compression properties, and good thermal cycling performance.

20 Claims, 7 Drawing Sheets

Related U.S. Application Data

(60) Provisional application No. 62/703,121, filed on Jul. 25, 2018.

(51) Int. Cl.
*C08F 220/06* (2006.01)
*C08K 3/013* (2018.01)

(58) Field of Classification Search
CPC ....... C09J 2463/00; C08F 2/50; C08F 220/06; C08F 222/1067; C08K 3/013; C09D 4/00
See application file for complete search history.

(56) References Cited

U.S. PATENT DOCUMENTS

| | | | |
|---|---|---|---|
| 5,317,068 A * | 5/1994 | Watanabe | C08G 59/38 525/527 |
| 8,618,204 B2 | 12/2013 | Campbell et al. | |
| 9,345,647 B2 | 5/2016 | Jin et al. | |
| 9,574,118 B2 | 2/2017 | Cheng et al. | |
| 2002/0117259 A1 | 8/2002 | Giroux et al. | |
| 2004/0229990 A1 | 11/2004 | Righettini et al. | |
| 2010/0065210 A1 | 3/2010 | Schuft et al. | |
| 2011/0126980 A1 | 6/2011 | Campbell et al. | |
| 2012/0142807 A1 | 6/2012 | Jin et al. | |
| 2013/0053497 A1 | 2/2013 | Tully et al. | |
| 2014/0275419 A1 | 9/2014 | Ward et al. | |
| 2015/0001343 A1 * | 1/2015 | Bernadet | B64C 1/12 244/119 |
| 2015/0184023 A1 * | 7/2015 | Yalcin | B05D 3/007 138/146 |
| 2016/0152879 A1 | 6/2016 | Elgimiabi et al. | |
| 2018/0072924 A1 | 3/2018 | Thompson et al. | |
| 2021/0252830 A1 * | 8/2021 | Zook | C09D 181/00 |

FOREIGN PATENT DOCUMENTS

| | | |
|---|---|---|
| CN | 104178075 A | 12/2014 |
| CN | 105419661 A | 3/2016 |
| CN | 106634641 A | 5/2017 |
| CN | 108102556 A | 6/2018 |
| CN | 108314980 A | 7/2018 |
| EP | 1882022 B1 | 5/2009 |
| JP | 2011529118 A | 12/2011 |
| JP | 2012530152 A | 11/2012 |
| JP | 2013540852 A | 11/2013 |
| JP | 2020517772 A | 6/2020 |
| WO | 2012035112 A1 | 3/2012 |
| WO | 2013074265 A1 | 5/2013 |
| WO | 2018022490 | 2/2018 |
| WO | 2018195524 A1 | 10/2018 |

OTHER PUBLICATIONS

Cab-O-Sil (R) M-5 Untreated Fumed Silica Data Sheet, Cabot Corp. (Year: 2006).*
International Search Report issued in connection with International Patent Application No. PCT/US2019/042520 mailed on Oct. 24, 2019.

* cited by examiner

Hybrid 31

Hybrid 40-2

FAST CURING EPOXY ACRYLIC LIQUID SHIM

BACKGROUND

Field

The present disclosure is directed to liquid shim, especially fast curing liquid shim.

Brief Description of Related Technology (Meth)acrylate-based adhesives, cured by free radical addition reaction mechanisms have been suggested for use in applications which require fast curing. While these (meth)acrylate based adhesives form flexible bonded joints which exhibit beneficial properties in some applications, high shrinkage stress that results from the acrylate moiety lingers and will need to be reduced.

Curable epoxy resins have also been used as adhesive compositions. While epoxy adhesives form a tight polymer network and are characterized by excellent mechanical properties, low shrinkage, durability, good adhesion, and good chemical and heat resistance qualities, they tend to be brittle, and often require high curing temperatures and long setting times.

The need for fast curing liquid shim materials remains a key requirement of aerospace applications. New trends in manufacturing call for fast cure, and sufficient handling time. By improving the cure rate of the liquid shim materials, aerospace manufacturers can improve output of the assembly line and free up equipment and storage space.

In addition to the fast cure rate, one of the important properties for liquid shim material is the mechanical strength, as in the structural assembly shimming material needs to transfer and withstand considerable amount of load without distortion or cracking through a wide temperature window.

Thermal cycling test simulates the static stress applied to bond line of liquid shim within the service environmental extremes. It is well recognized that the residue stress from curing and from thermal expansion/shrinkage can initiate microcracking in crosslinked systems. If the systems are not toughened enough, microcracks will propagate and result in premature failure at low load and ultimate loss of mechanical integrity over long period of time.

It is deemed to be a need for compositions that address the above marketplace requirements.

SUMMARY

The present disclosure does that. Accordingly, provide herein is a novel, quick-setting, room-temperature-curable liquid shim material, which combines the room temperature curing and quick setting features of the acrylic-based adhesives with the strong mechanical properties and durability of the epoxy resin-based adhesives, specifically high compression properties and good thermal cycling resistance for liquid shim applications.

The present disclosure is directed to fast-curing two part, room temperature epoxy/(meth)acrylate compositions. In part, the embodiments include those compositions comprising an A-part and a B-part resin, and the mixtures thereof, and cured compositions derived therefrom. The A-part compositions comprise components associated with (meth)acrylic acid/(meth)acrylate resins and epoxy curatives. The B-part compositions comprise components associated with epoxy resins and (meth)acrylic acid/(meth)acrylate curatives. The combined composite resins offer advantages over conventional resins, including faster curing times and improved physical properties, including high compression and good thermal cycling properties, such as described herein. The compositions are particularly useful for liquid shim applications.

Certain embodiments provide two part, room-temperature curable hybrid epoxy/(meth)acrylate compositions, comprising: (a) a first component, comprising (meth)acrylate monomers, crosslinkers, free radical accelerator, epoxy curatives, and optional inhibitors, tougheners, fillers and additives; and (b) a second component, comprising epoxy resins, methacrylate free radical initiators, and optional tougheners, fillers and additives.

In many considerations, some embodiments provide two-part, room-temperature curable compositions comprising:
(a) an A-part composition, comprising:
  (i) a (meth)acrylic acid/(meth)acrylate resin component, with or without an optional accelerator for curing the (meth)acrylic acid/(meth)acrylate resin component;
  (ii) an epoxy curative; and
  (iii) optional additives; and
(b) a B-part compositions comprising
  (iv) an epoxy resin component;
  (v) a (meth)acrylic acid/(meth)acrylate polymerization initiator; and
  (vi) optional additives;
which either A-part or B-part, or both A-part and B-part comprise additive(s), which when mixed provides a fast curing, co-curable composition. Additionally, to the combination, each of these A-part and B-part compositions may be considered independent embodiments of one another The compositions provide among other advantageous properties fast cure rate, extremely high compression properties, and good thermal cycling performance.

The relative proportion of the A-part composition and the B-part composition can vary from 95/5 wt % to 5/95 wt. In some embodiments, the (meth)acrylic acid/(meth)acrylate resin component in A-part composition comprises at least one acid functional (meth)acrylate and/or (meth)acrylate ester monomer, and at least one di(meth)acrylate, tri(meth)acrylate, and/or tetra(meth)acrylate crosslinker. The one acid functional (meth)acrylate and/or (meth)acrylate estermay be represented by $H_2C=CGCO_2R^1$, wherein G and $R^1$ are described elsewhere herein. In specific embodiments, the acid functional (meth) acrylate comprises (meth)acrylic acid.

In still further embodiments, the curable composition the B-part composition comprises an epoxy resin comprises one or more glycidyl ethers, further described elsewhere herein. Exemplary embodiments include those where the glycidyl ether comprises bisphenol-A diglycidyl ether epoxy resin and/or tetraglycidyl and/or triglycidyl resin, preferably with aromatic rings, for example a 2,7,2',7'-tetraglycidyloxynaphthalene methane, 1,1,2,2-tetrakis(4-glycidyloxyphenyl)ethane, and/or a triglycidyl derivative of 4,4',4''-trihydroxyphenyl methane. The B-part composition comprises at least one (meth)acrylic acid/(meth)acrylate polymerization initiator, preferably an organic peroxide, more preferably a benzoyl peroxide.

In still further embodiments, the curable composition comprises additives in either A-part or B-part, or both A-part and B-part composition, including for example one or more of fillers, tougheners, or pigments, for example titania pigments, fumed and/or fused silica, ceramic microspheres, silicates (e.g., mica), aluminum powder, chopped carbon fibers. Additional types of additives are also described elsewhere herein. These additives may be present in the either A-part or B-part, or with respect to the total compositions in a range of from 15 to 90 wt %, preferably from 60 to 85 wt %. Typically, the additives may be characterized as one or more of:

(i) at least one sub-micron filler having a particle size in a range of from 0.1 to 0.5 microns, preferably from 0.2 microns to 0.3 microns;

(ii) at least one mid-sized filler having a particle size in a range of from 1 micron to 10 microns, preferably from about 2.5 to about 7.5 microns, present in a range of from 0 to 10 wt %, preferably from 4 to 8 wt %;

(iii) at least one larger-sized filler having a particle size in a range of from 20 to 50 microns, preferably from 20 to 35 microns, present in a range of from 20 to 50 wt %, preferably from 25 to 35 wt %; and (iv) at least one chopped fiber, preferably carbon fiber, having a length in a range of from 25 to 200 microns, preferably from 50 to 150 micron, present in a range of from 0 to 10 wt % preferably from 5 to 10 wt %.

Still further embodiments include those compositions resulting from the mixing of any of the curable composition described herein, including those compositions comprising the pre-cured, partially cured, or post-cured composition thereof.

Whereas the compositions are generally described herein as separate A-part and B-part compositions, or deriving from such separate compositions, it should be appreciated that any combination of compositional elements which provide for the same resulting mixtures, provided that such resulting mixture cures with the rates described herein and that such cured materials exhibit the superior physical attributes described herein. Such embodiments include, for example, those where the (meth)acrylic acid/(meth)acrylate resin component and the epoxy resin component are provided separately or together in a first part (for example, labeled C-part) and the initiators for each resin are provided separately or in a second part (for example, labeled D-part), and where one or more of the optional additives are provided either separately in one or both of the C- and D-parts.

In certain additional embodiments, the combined A-part and B-part compositions (or permutation thereof) provides an as-mixed composition that cures to a Shore D hardness of at least 70 in less than 210 min, 200 min, 190 min, 180 min, 170 min, 160 min, 150 min, 140 min, 130 min, or 120 minutes, when cured at room temperature.

In other embodiments, the cured composition is characterized by one or more of the following attributes:

(a) a Shore D hardness in a range of from 70 to 90, or a sub-range thereof;

(b) a compression strength in a range of from 15 to 30 kilopound per square inch (ksi), or a sub-range thereof, when tested at 24° C. according to ASTM D695;

(c) a compression strength in a range of from 10 to 20 kilopound per square inch (ksi), or a sub-range thereof, when tested at 88° C. according to ASTM D695;

(d) a compression modulus in a range of from 1100 to 1700 kilopound per square inch (ksi), or any sub-range thereof, when tested at 24° C. according to ASTM D695;

(e) a compression modulus in a range of from 600 to 1200 kilograms per square inch (ksi), or any sub-range thereof, when tested at 88° C. according to ASTM D695; or (f) resistance to cracking under a thermal cycling protocol, characterized by little or no visible cracking after thermal cycling conditions described elseherein.

Still further embodiments include those kits comprising the two-part, room-temperature curable composition of any of the embodiments described herein, where the separate parts of the composition are stored separately from one another.

Still further embodiments include method for applying the compositions to an interface between two or more substrates and allowing the composition to cure, and the structures or assemblies which result from such applications.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings.

DETAILED DESCRIPTION

Figure 1:
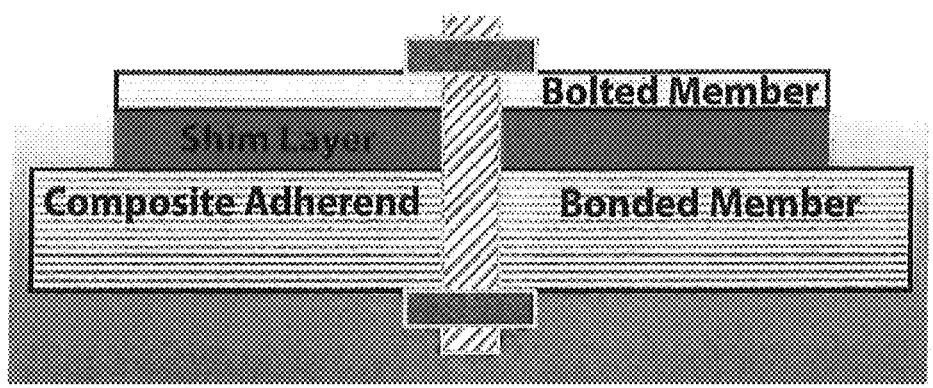
FIG. 1 shows a schematic of a shim.

The inventive hybrid epoxy/(meth)acrylate liquid shim meets the stringent requirement of accelerated cure time, excellent mechanical performance and good thermal cycling resistance, which provide benefits to applications seeking a combination of processing speed and ultimate performance.

The present disclosure may be understood more readily by reference to the following detailed description taken in connection with the accompanying Figures, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to the liquid shims and to the methods of preparing and using the same.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When values are expressed as approximations by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, reference to values stated in ranges includes each and every value within that range.

It is to be appreciated that certain features of the disclosure which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the disclosure that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those that are independently described in terms of "consisting of" and "consisting essentially of." For those embodiments directed to the inventive methods or compositions, and provided in terms of "consisting essentially of," the basic and novel characteristic(s) is of the compositions the provision of compositions that exhibit the properties associated with the compositions or mixtures as described herein.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Where the specification provides values associated with certain physical properties, if otherwise unstated, those properties relate to measurement methods and techniques known in the art of liquid shims. Any descriptions provided in the Examples may be considered as representative or exemplary of the methods used to describe the more general descriptions provided herein.

Throughout this specification, words are to be afforded their normal meaning, as would be understood by those skilled in the relevant art. However, so as to avoid misunderstanding, the meanings of certain terms will be specifically defined or clarified.

The term "alkyl" as used herein refers to a linear, branched, or cyclic saturated hydrocarbon group typically although not necessarily containing 1 to about 24 carbon atoms, preferably 1 to about 12 carbon atoms. Where an alkyl group is described as having, for example, 1 to 6 carbon atoms, sub-embodiments include those alkyl groups having 1, 2, 3, 4, 5, or 6 carbons, or any combination of two or more of these values. The term "substituted alkyl" refers to alkyl groups substituted with one or more substituent groups, and the terms "heteroatom-containing alkyl" and "heteroalkyl" refer to alkyl groups in which at least one carbon atom is replaced with a heteroatom. If not otherwise indicated, the term "alkyl" includes linear, branched, cyclic, unsubstituted, substituted, and/or heteroatom-containing such alkyl groups, respectively.

The term "alkylene" as used herein refers to a difunctional linear, branched, or cyclic alkyl group, where "alkyl" is as defined above.

The terms "alkenyl," "alkenylene," "aromatic," "aryl," and "alkaryl" carry their normal meanings as understood by those skilled in the art of organic chemistry. Reference to any one of more of these terms, either by itself or in combination with another, includes those independent embodiments having 2 to 24 carbon atoms, 2 to 12 carbon atoms, 2 to 6 carbon atoms, 6 to 12 carbon atoms, 12 to 18 carbon atoms, 18 to 24 carbon atoms, or any combination of two or more of these ranges.

The terms "halo," "halide," and "halogen" are used in the conventional sense to refer to a chloro, bromo, fluoro, or iodo substituent.

By "functionalized" as in "functionalized (meth)acrylates," and the like, or "substituted," as is "substituted alkyl" is meant that in the (meth)acrylate, alkyl, or other moiety, at least one hydrogen atom bound to a carbon (or other) atom is replaced with one or more functional groups such as those described herein and above. The term "functional group" is intended to include any functional species that is suitable for the uses described herein.

For the sake of clarity, the use of the parenthetical "meth," as exemplified in the term "(meth)acrylates" or "(meth) acrylic acid" refers to independent embodiments of acrylates, acrylic acids, methacrylates, methacrylic acids, or mixtures or copolymers comprising these.

"Optional" or "optionally" means that the subsequently described circumstance may or may not occur, so that the description includes instances where the circumstance occurs and instances where it does not. For example, the phrase "optionally substituted" is equivalent to "substituted or unsubstituted" and means that a non-hydrogen substituent may or may not be present on a given atom, and, thus, the description includes structures wherein a non-hydrogen substituent is present and structures wherein a non-hydrogen substituent is not present.

Unless otherwise stated, the term "room temperature" refers to a temperature range of from about 15° C. to about 25° C., though in separate embodiments, the curing temperatures of the disclosed compositions can be described as encompassing ranges of from 10° C. to 15° C., from 15° C. to 18° C., from 18° C. to 20° C., from 20° C. to 22° C., from 22° C. to 25° C., from 25° C. to 28° C., from 28° C. to 31° C., from 31° C. to 34° C., from 34° C. to 38° C., or any combination of two or more of these ranges.

Compositions

In some embodiments, the present disclosure describes two-part, room-temperature curable compositions comprising:
  (a) an A-part composition, comprising:
    (i) a (meth)acrylic acid/(meth)acrylate resin component;
    (ii) an epoxy curative; and
    (iii) optional additives; and
  (b) a B-part compositions comprising
    (iv) an epoxy resin component;
    (v) a (meth)acrylic acid/(meth)acrylate polymerization initiator; and
    (vi) optional additives;
which either A-part or B-part, or both A-part and B-part comprise additive(s), which when mixed provides a fast curing, co-curable composition.

These compositions are especially characterized by fast cure times, and physical properties (including Shore D hardness, compression strength and modulus, and resistance to cracking under thermal cycling conditions) that are superior to other materials. Whereas the compositions are generally described herein as separate A-part and B-part compositions, or deriving from such separate compositions, it should be appreciated that any combination of compositional elements which provide for the same resulting mixtures, provided that such resulting mixture cures with the rates claimed and that such cured materials exhibit the superior physical attributes described herein. Such embodiments include, for example, those where the (meth)acrylic acid/(meth)acrylate resin component and the epoxy resin component are provided separately or together in a first part (for example, labeled C-part) and the initiators for each resin are provided separately or in a second part (for example, labeled D-part), and where one or more of the optional additives are provided either separately or in one or both of the C- and D-parts.

In certain embodiments, the curable compositions are given where the relative proportion of the A-part composition and the B-part composition is in a range of from 95/5 wt % to 5/95 wt %. Additional embodiments include those where these increments can also be described in terms of one or more ranges including 95/5 to 90/10, from 90/10 to 85/15, from 85/15 to 80/20, from 80/20 to 75/25, from 75/25 to 70/30, from 70/30 to 65/35, from 65/35 to 60/40, from 60/40 to 55/45, from 55/45 to 50/50, from 50/50 to 45/55, from 45/55 to 40/60, from 40/60 to 35/65, from 35/65 to 30/70, from 30/70 to 25/75, from 25/75 to 20/80, from 20/80 to 15/85, from 15/85 to 10/90, and from 10/90 to 5/95, for example from 60/40 to 90/10 wt %, preferably from 70/30 wt % to 85/15 wt %, more preferably from 75/25 wt % to 80/20 wt %.

The (Meth)Acrylic Acid/(Meth)Acrylate Resin Component

The (meth)acrylic acid/(meth)acrylate resin component of the presently disclosed compositions may include a wide variety of acid functional (meth)acrylate and/or (meth)acrylate ester monomers, and di(meth)acrylate, tri(meth)acrylate, and/or tetra(meth)acrylate crosslinkers. For convenience, the term "(meth)acrylate" is intended to refer to both acrylate and methacrylate, as well as acrylic and methacrylic.

For instance, broadly (meth)acrylate monomers suitable for use as the at least one acid functional (meth)acrylate and/or (meth)acrylate ester may be chosen from those represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Di(meth)acrylate, tri(meth)acrylate, and tetra(meth)acrylate a crosslinkers suitable for use herein include polyethylene glycol di(meth)acrylates, tetrahydrofuran and di(meth)acrylates, hexanediol di(meth)acrylate trimethylol propane triacrylate ("TMPTA"), trimethylol propane tri(meth)acrylate ("TMPTMA"), diethylene glycol di(meth)acrylate, triethylene glycol di(meth)acrylate, tetraethylene glycol di(meth)acrylate, dipropylene glycol di(meth)acrylate, di-(pentamethylene glycol) di(meth)acrylate, tetraethylene diglycol diacrylate, diglycerol tetra(meth)acrylate, tetramethylene di(meth)-acrylate, ethylene di(meth)acrylate, neopentyl glycol diacrylate, and bisphenol-A di(meth)acrylates, such as ethoxylated bisphenol-A di(meth)acrylate ("EBIPMA"), polybutadiene dimethacrylate, 1,6-hexanediol diacrylate, pentaerythritol tetramethacrylate, trimethylolpropane ethoxylate triacrylate, 2,2-bis[4-(2-hydroxy-3-methacryloxypropoxy)phenyl]propane].

Higher-functionalized (meth)acrylates, such as penta, hexa, septa and the like, may also be used. Examples of such higher functionalized (meth)acrylates include pentaerythritol tetra(meth)acrylate, dipentaerythritol penta(meth)-acrylate, and polyester (meth)acrylates [e.g., tetra and hexa (meth)acrylate, commercially available examples of which include those sold by UCB Radcure, Inc., Smyrna, Ga. under the trademark "EBECRYL", such as "EBECRYL" 82 (low viscosity modified polyester acrylate having fast cure and high glass transition properties), "EBECRYL" 450 (fast curing fatty acid-modified polyester hexaacrylate with excellent lithographic behavior and good pigment wetting), "EBECRYL" 657 (polyester tetraacrylate with excellent lithographic behavior and pigment wetting for inks), "EBECRYL" 810 (fast curing multi-functional polyester acrylate with low viscosity), "EBECRYL" 830 (multi-functional polyester acrylate having fast cure, abrasion resistance, hardness and solvent resistance) and "EBECRYL" 870 (hexafunctional polyester acrylate oligomer having good lithographic properties with fast cure).

Other higher functionalized(meth)acrylate crosslinkers may also be used, such as reaction products of diglycidylether of bisphenol A or polyglycols with (meth)acrylic acid forming a (meth)acrylate ester, with polyglycols of which corresponding to the structure shown below:

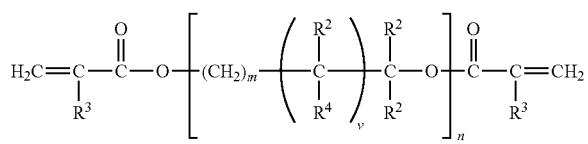

where R² may be selected from hydrogen, alkyl groups having from 1 to about 4 carbon atoms, hydroxyalkyl groups having from 1 to about 4 carbon atoms or

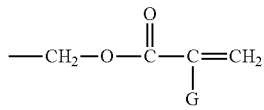

where G is as defined above; R³ may be selected from hydrogen, halogen, and alkyl groups of from 1 to about 4 carbon atoms; R⁴ may be selected from hydrogen, hydroxy and

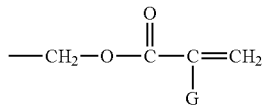

m is an integer equal to at least 1, e.g., from 1 to about 8 or higher, for instance, from 1 to about 4; v is 0 or 1; and n is an integer equal to at least 1, e.g., 1 to about 20 or more.

Urethane-functionalized (meth)acrylates may also be used herein. For instance, UCB offers for sale commercially a number of such materials including those available under the trademark "EBECRYL", such as "EBECRYL" 264 [aliphatic urethane triacrylate diluted 15% with hexanediol di(meth)acrylate ("HDODA"), for providing non-yellowing, fast curing coatings with excellent abrasion and stain resistance, toughness and flexibility], "EBECRYL" 265 [aliphatic urethane triacrylate diluted 25% with tripropylene glycol diacrylate ("TRGDA")], 1290 (hexafunctional aliphatic urethane acrylate containing an acrylated polyol diluent), "EBECRYL" 8301 (hexafunctional aliphatic urethane acrylate containing an acrylated polyol diluent, for providing fast cure with excellent hardness, solvent and abrasion resistance), "EBECRYL" 220 (multi-functional aromatic urethane acrylate containing an acrylated polyol diluent, which provides extremely fast cure with excellent hardness and solvent resistance properties), and "EBECRYL" 6602 (trifunctional aromatic urethane acrylate oligomer diluted to provide coatings with good hardness, scratch and abrasion resistance properties).

In addition, Sartomer Co., Exton, Pa. offers sale commercially a number of such materials including CN 945 A60 (trifunctional urethane acrylate), CN 945 B85 (trifunctional urethane acrylate), CN 970 A60 (urethane acrylate), CN 970 E60 (urethane acrylate), CN 970 A80 (urethane acrylate), CN 972 (urethane acrylate), and CN 975 (hexafunctional urethane acrylate).

Of course, combinations of these (meth)acrylate monomers may also be used as the (meth)acrylate component of the present invention.

In certain specific embodiments, then, the (meth)acrylic acid/(meth)acrylate resin component in A-part composition comprises at least one acid functional (meth)acrylate and/or (meth)acrylate ester, and at least one di(meth)acrylate, tri (meth)acrylate, and/or tetra(meth)acrylate. Again, the term "(meth)acrylic acid" is either or both of acrylic acid and methacrylic acid. In more specific embodiments, the (meth)acrylate ester can be an isobornyl or other bicyclic (meth)acrylate.

In some embodiments, the acid functional (meth) acrylate comprises (meth)acrylic acid.

The (meth)acrylic acid/(meth)acrylate resin component may also comprise other acid functional (meth)acrylates, such as 2-carboxyethyl acrylate, hydroxy ethyl methacryl (HEMA) succinate, HEMA maleate, 2-sulfoethyl methacrylate, and beta-carboxyethyl acrylate.

In other embodiments, the (meth)acrylates monomers may also include tetrahydrofuran (meth)acrylates, hydroxypropyl (meth)acrylate, benzyl (meth)acrylate, tert-butyl methacrylate, 2-carboxyethyl acrylate, 2-[(butylamino)carbonyl)oxy]ethyl acrylate, 2-hydroxy-3-phenoxypropyl acrylate, poly(ethylene glycol)phenyl ether acrylate, 2-phenoxyethyl methacrylate, urethane dimethacrylate, ethoxyethyl methacrylate, vinyl methacrylate, glycidyl methacrylate.

The (meth)acrylic acid/(meth)acrylate resin component may also comprise an ethoxylated di(meth)acrylate in which the ethoxylated di(meth)acrylate comprises an ethoxylated (2-4) bisphenol A di(meth)acrylate; i.e., that the number of moles of ethoxylate can be independently 2, 3, or 4, with the dimethacrylate end groups capping an ethoxylated bisphenol A. The dimethacrylate can also comprise 2,2-bis[4-(2-hydroxy-3-methacryloxypropoxy)phenyl]propane]. In some preferred embodiments, the ratio of the at least one (meth) acrylic acid and/or (meth)acrylate ester to the at least one ethoxylated di(meth)acrylate is in a range of from 1:3 to 3:1. In still other embodiments, the range is defined in terms of one or more sub-ranges of from 1:3 to 1:2.5, from 1:2.5 to 1:2, from 1:2 to 1:1.5, from 1:1.5 to 1:1, from 1:1 to 1.5:1, from 1.5:1 to 2:1, from 2:1 to 2.5:1, and from 2.5:1 to 3:1, for example, preferably from 1:2 to 2:1, and more preferably from 1:1.5 to 1.5:1.

The (meth)acrylic acid/(meth)acrylate resin component may also comprise other acid functional (meth)acrylates, such as 2-carboxyethyl acrylate, hydroxy ethyl methacryl (HEMA) succinate, HEMA maleate, 2-sulfoethyl methacrylate, and beta-carboxyethyl acrylate.

In other embodiments, the (meth)acrylates, di(meth)acrylate, tri(meth)acrylate, and tetra(meth)acrylate may also include polyethylene glycol di(meth)acrylates, tetrahydrofuran (meth)acrylates and di(meth)acrylates, hydroxypropyl (meth)acrylate, hexanediol di(meth)acrylate trimethylol propane triacrylate, trimethylol propane tri-(meth)acrylate, diethylene glycol di(meth)acrylate, triethylene glycol di(meth)acrylate, tetraethylene glycol di(meth)-acrylate, benzyl (meth)acrylate, dipropylene glycol di(meth)-acrylate, di-(pentamethylene glycol) di(meth)acrylate, tetraethylene diglycol diacrylate, diglycerol tetra(meth)-acrylate, tetramethylene di(meth)acrylate, ethylene di(meth)-acrylate, neopentyl glycol diacrylate, and bisphenol-A di(meth)acrylates, tert-butyl methacrylate, 2-carboxyethyl acrylate, 2-[(butylamino)carbonyl)oxy]ethyl acrylate, 2-hydroxy-3-phenoxypropyl acrylate, poly(ethylene glycol)phenyl ether acrylate, 2-phenoxyethyl methacrylate, polybutadiene dimethacrylate, urethane dimethacrylate, ethoxyethyl methacrylate, vinyl methacrylate, 1,6-hexanediol diacrylate, Pentaerythritol tetramethacrylate, glycidyl methacrylate, trimethylolpropane ethoxylate triacrylate, 2,2-bis[4-(2-hydroxy-3-methacryloxypropoxy)phenyl]propane]

The A-part component of the curable composition may also further comprise an accelerator for curing the (meth) acrylic acid/(meth)acrylate resin component. In preferred embodiments, this accelerator is a free radical accelerator.

The A-part component of the curable composition may also comprise at least one epoxy curative. In certain preferred embodiments, the epoxy curative is one or more phosphorus-containing compound and may be any derivative of phosphinic acid, phosphonic acid or phosphoric acid having at least one P—OH group and at least one organic moiety characterized by the presence of an olefinic group. A preferred phosphorus-containing compound is phosphoric acid 2-hydroxyethyl methacrylate ester.

The A-part composition typically comprises at least about 10 wt % of the (meth)acrylic acid/(meth)acrylate resin component. In certain embodiments, the amount of (meth) acrylic acid/(meth)acrylate resin component in the A-part composition can be described in terms of one or more sub-ranges of from 10 to 12 wt %, from 12 to 14 wt %, from 14 to 16 wt %, from 16 to 18 wt %, from 18 to 20 wt %, from 20 to 24 wt %, from 24 to 28 wt %, from 28 to 32 wt %, from 32 to 36 wt %, from 36 to 40 wt %, from 40 to 50 wt %, from 50 to 60 wt %, from 60 to 70 wt %, from 70 to 80 wt %, from 80 to 90 wt %, and from 90 to 100 wt %, for examples preferably at least about 12 wt %, more preferably about 12 wt % to 40 wt %.

The Epoxy Resin Component

As describe elsewhere herein, the curable composition comprises an epoxy resin component, preferably in the B-part of the composition, which may have at least one multifunctional epoxy resin. This epoxy resin typically comprises at least one of a $C_{4-28}$ alkylene diglycidyl ether, a $C_{2-28}$ alkylene- and/or alkenylene-diglycidyl ester; a $C_{2-28}$ alkylene-, mono- and poly-phenol glycidyl ether; a polyglycidyl ether of trimethylol propane, pyrocatechol, resorcinol, hydroquinone, 4,4',4"-trihydroxyphenyl methane, 4,4'-dihydroxydiphenyl methane (or bisphenol F), 4,4'-dihydroxy-3, 3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, or tris(4-hydroxyphenyl)methane; a bisphenol-A diglycidyl ether epoxy resin; bisphenol-F diglycidyl ether epoxy resin; a diglycidyl novalac epoxy resin; or a methylenebis(naphthalene)-diol, -triol, or -tetrol, 2,7,2',7'-tetraglycidyloxynaphthalene methane and/or 1,1,2, 2-tetrakis(4-glycidyloxyphenyl)ethane, polyglycidyl ethers of the chlorination and bromination products of the above-mentioned diphenols, polyglycidyl ethers of novolacs, polyglycidyl ethers of polyphenols obtained by condensing phenols and long-chain halogen paraffins containing at least two halogen atoms; N,N'-diglycidyl-aniline, N,N'-dimethyl-N,N'-diglycidyl-4,4'-diaminodiphenyl methane, N,N,N'N,-tetraglycidyl-4,4'-diaminodiphenyl methane, N,N'-diglycidyl-4-aminophenyl glycidyl ether, N,N,N'N'-tetraglycidyl-1,3-propylene bis-4-aminobenzoate, phenol novolac epoxy resin, cresol novolac epoxy resin sorbitol glycidyl ether, and combinations thereof.

In specifically enumerated embodiments, the epoxy resin comprises a bisphenol-A diglycidyl ether epoxy resin. In other enumerated embodiments, the epoxy resin comprises a tetraglycidyl and/or triglycidyl resin, preferably with aromatic rings. Exemplary triglycidyl derivatives include those of 4,4',4"-trihydroxyphenyl methane. Exemplary tetra glycidyl derivatives include those of a 2,7,2',7'-tetraglycidyloxynaphthalene methane or a 1,1,2,2-tetrakis(4-glycidyloxyphenyl)ethane.

In certain embodiments, the epoxy resin component comprises at least one diglycidyl epoxy resin component, and at least one di-glycidyl, tri-glycidyl, and/or tetra-glycidyl epoxy resin component. In certain specific embodiments, the relative proportions of the diglycidyl:tri-glycidyl:tetra-glycidyl epoxy resin component is in a range from 4 parts to 14 parts:from 4 parts to 10 parts:from 3 parts to 8 parts by weight, relative to the total epoxy resin, preferably ranging from 6 to 10 parts:from 6 parts to 8 parts:from 4 parts to 5 parts by weight, relative to the total epoxy resin.

The curable composition also comprises a (meth)acrylic acid/(meth)acrylate polymerization initiator, preferably in the B-part component. This polymerization initiator is preferably an organic peroxide, more preferably a benzoyl peroxide. In certain embodiments, the composition contains transition metal complex initiators. In other embodiments, the curable composition contains no transition metal complex polymerization initiators.

Additives and Fillers

As described elsewhere herein, the curable compositions may contain organic and/or inorganic additives and/or fillers in either the A-part or B-part, or in both the A-part and B-part composition, as well as an accumulated mix of additives in the as-mixed and cured compositions. As used herein, the term "filler" tends to refer to solid materials, whereas "additives" may comprise solid or liquid materials. The term "additive" therefore encompasses filler materials. These additives may be added to confer structural reinforcement, viscosity or thixotropy adjustment, thermal or electrical conductivity, adhesive or cohesive strength, toughness, or other useful attribute. The additives, for example, may comprise one or more of fillers, tougheners, or pigments, for example titania pigments, fumed and/or fused silica, ceramic microspheres, silicates (e.g., mica), aluminum powder, chopped carbon fibers.

In independent embodiments, the A-part, the B-part, or the total composition comprises additives in a range of from 10 wt % to 85 wt %, based on the total weight of the composition. In independent embodiments, the A-part, the B-part, or the total composition comprises additives in two or more ranges of from 10 to 20 wt %, from 20 to 30 wt %, from 30 to 40 wt %, from 40 to 50 wt %, from 50 to 55 wt %, from 55 to 60 wt %, from 60 to 65 wt %, from 65 to 70 wt %, from 70 to 75 wt %, from 75 to 80 wt %, from 80 to 85 wt %, from 85 to 90 wt %, and/or from 90 to 95 wt %, based on the total weight of the composition, for example, from 65 to 90 wt % or from 60 wt % to 85 wt % additives. Any fraction from 0 to 100% of these additives may be fillers, within these ranges.

The additives may be characterized in terms of their chemical compositions or their size or both. For example, a fumed silica may be referred to herein in under the context of silica or sub-micron particles. An embodiment described in terms of a particular chemical composition in a given physical form may also be considered to refer to that chemical composition in another referenced form. For example, a reference to carbon black should be interpreted as meaning that other forms of carbon are suitable additives, for example carbon whiskers.

The additives comprise at least one toughener. Toughener may comprise reactive liquid rubber, core-shell polymers, surface activated rubber particle, carbon nanotube, surface modified nanosilica, thermoplastic additives, or combination of the above.

In certain embodiments, the fillers and additives may include fibers, microfibers, fibrils, whiskers, microspheres, nanotubes, nano-, submicron-, or micron-sized particles, or nano-, micro-, or macro-platelets. The fillers may be as-presented or coated with another material (e.g., silica-coated aluminum or aluminum nitride or nickel coated organic polymers). Typically, the fillers comprise solids of different size dimensions and shapes to optimize, for example, packing or other physical attribute of the systems. Fillers may be organic or inorganic, depending on the ultimate performance desired in the cured composition.

Exemplary filler and additive materials include glasses (silicate, borosilicate, aluminosilicate, etc.), ceramics (e.g., nitrides, oxides, or carbides, such as aluminum nitride, boron nitride, silicon nitride, aluminum carbide, boron carbide, silicon carbide, alumina, silica, or mixtures thereof), polymorphs of carbon (e.g., from diamond to graphite/graphene to carbon black or amorphous soot), metals (e.g., aluminum, copper, nickel, silver, zinc), metal oxides, carbonates or hydrated oxides (e.g., calcium carbonate, calcia, magnesium carbonate, titania, zinc oxide, zirconia, and the like), and synthetic or natural organic polymers or other natural fillers (e.g., such as ground nut shell, ground feathers, and the like)

Specific fillers and additives may comprise inorganic and/or organic fillers, for example glass fibers, carbon fibers, synthetic fibers, natural fibers from plant and/or animal sources, chopped fibers, microfibers, mineral fibers, milled fibers, and/or whiskers; reinforcing silicas, including fumed or fused silica; ceramic fiber whiskers; ceramic microspheres, titania, zirconia, aluminum nitride, aluminum hydroxide, alumina trihydrate, boron nitride, zinc oxide, magnesium oxide, magnesium hydroxide, aluminum oxide, silicon nitride, silica-coated aluminum nitride, quartz, silicates, microballoons, glass microspheres, silicon carbide, graphite, carbon black, barium sulfate, aluminum, stainless steel, iron, nickel, tungsten, silver, various nanoparticles, and combinations thereof.

Reinforcing silicas, such as fused or fumed silicas, may be untreated or treated so as to alter the chemical nature of their surface. Virtually any reinforcing fused or fumed silica may be used. Examples of such treated fumed silicas include polydimethylsiloxane-treated silicas and hexamethyldisilazane-treated silicas. Such treated silicas are commercially available, such as from Cabot Corporation under the tradename CAB-O-SIL ND-TS, TS610, TS710, or TS720 and Degussa Corporation under the tradename AEROSIL, such as AEROSIL R805 or R8200. Of the untreated silicas, amorphous and hydrous silicas may be used. For instance, commercially available amorphous silicas include AEROSIL 300 with an average particle size of the primary particles of about 7 nm, AEROSIL 200 with an average particle size of the primary particles of about 12 nm, AEROSIL 130 with an average size of the primary particles of about 16 nm; and commercially available hydrous silicas include NIPSIL E150 with an average particle size of 4.5 nm, NIPSIL E200A with and average particle size of 2.0 nm, and NIPSIL E220A with an average particle size of 1.0 nm (manufactured by Japan Silica Kogya Inc.). A particularly desirable fumed silica is hydrophobic fumed silica, such as CAB-O-SIL TS720, which has been surface treated with polydimethylsiloxane (PDMS). This hydrophobic fumed silica is a particularly desirable choice to act as a thixotropy conferring component.

Alternatively, the fillers and additives may be described in terms of particle sizes. For example, in certain embodiments, the A-part and B-part may each contribute some or all of fillers, as described elsewhere herein, according to:

(i) at least one sub-micron filler (e.g., comprising silica, carbon, metals, or metal oxides) having a mean particle size in a range of from 0.1 to 0.5 microns, preferably from 0.2 microns to 0.3 microns, present in a range of from 0 to 5 wt %, preferably from 0.01 to 3 wt %, relative to the total weight of the A-part composition; additional embodiments provide that the at least one sub-micron filler may be present in the composition from 0 to 5 parts, preferably 0.01 parts to 3 parts, relative to the total proportion of fillers in the total composition;

(ii) at least one mid-sized filler having a mean particle size in a range of from 1 micron to 10 microns, preferably from about 2.5 to about 7.5 microns, present in a range of from 0 to 10 wt %, preferably from 4 to 8 wt %, relative to the total weight of the A-part composition; additional embodiments provide that the at least one mid-sized filler may be present in the composition from 0 to 10 parts, preferably from 4 to 8 parts, relative to the total proportion of fillers in the total composition;

(iii) at least one larger-sized filler (e.g., silica, carbon, metals, silicates, ceramic microspheres) having a mean particle size in a range of from 10 to 50 microns, preferably from 20 to 35 microns, present in a range of from 20 to 50 wt %, preferably from 25 to 35 wt %, relative to the total weight of the A-part composition; additional embodiments provide that the at least one larger-sized filler may be present in the composition from 20 to 50 parts, preferably 25 parts to 35 parts, relative to the total proportion of fillers; and (iv) at least one chopped fiber, preferably carbon fiber (but also glass or organic polymer fiber, as described elsewhere), having an average length in a range of from 10 to 200 microns, preferably from about 50 to 150 micron, present in a range of from 0 to 10 wt %, preferably from 5 to 10 wt %, relative to the total weight of the A-part composition; additional embodiments provide that the at least one chopped fiber may be present in the composition from 0 to 10 parts, preferably 5 parts to 10 parts, relative to the total proportion of fillers.

That is, the fillers and additives may be present in certain embodiments in an approximate weight ratio of sub-micron:mid-sized:larger particle size:chopped fiber of from 0 to 10:from 0 to 20:from 40 to 100:from 0 to 20 such that the total is 100%, relative to one another, whether present in the A-part or B-part of total composition. This ratio corresponds to from 0 to 5 parts:from 0 to 10 parts:from 20 to 50 parts:from 0 to 10 parts by weight, relative to the total weight of the filler, and preferably to from 0.01 to 3 parts:from 4 to 8 parts:from 25 to 35 parts:from 5 to 10 parts by weight.

In still more specific embodiments, the curable composition may be characterized by a composition of Column A or Column B.

| Raw Material | Column A Relative to Total Ratio [% wt] | Column B Relative to Part A/B Ratio [% wt] |
|---|---|---|
| Part A | | |
| (Meth)acrylic Acid/Ester | 5-20 wt % | 5-30 wt % |
| Ethoxylated dimethacrylate | 5-20 wt % | 5 to 25 wt % |
| Free radical acrylate accelerator | 1 to 2 wt % | 1 to 3 wt % |
| phosphoric acid containing methacrylate ester epoxy curative | 5 to 10 wt % | 6 to 15 wt % |
| Titania, 0.2 um | 0 to 2 wt % | 0 to 3 wt % |
| Fumed silica 0.2-0.3 ums | 0 to 4 wt % | 0 to 6 wt % |

-continued

| Raw Material | Column A Relative to Total Ratio [% wt] | Column B Relative to Part A/B Ratio [% wt] |
|---|---|---|
| Silica fused 3-7 ums | 2 to 10 wt % | 3 to 12 wt % |
| Microspheres 12-26 ums | 6-15 wt % | 7 to 18 wt % |
| Fused silica 23-30 um or Spheroidal Al Powder, 23 um | 0 to 20 wt % | 0 to 30 wt % |
| Mica, 33 um | 5 to 10 wt % | 5 to 15 wt % |
| Chopped Fiber, 45-150 um | 0 to 8 wt % | 0 to 12 wt % |
| Part A Total | 75 to 80 wt % | |
| Part B | | |
| Toughener dispersed in epoxy resin | 5 to 10 wt % | 26-39 |
| Diglycidyl aromatic epoxy resin | 5 to 10 wt % | 20-30 |
| Tetraglycidyl aromatic epoxy resin | 3 to 6 wt % | 16-23 |
| BPO 75%/in diglycidyl epoxy resin | 5 to 10 wt % | 24-35 |
| Part B Total | 20-25 wt % | |
| Part A Part B Total | 100 | 100 |
| Part A:Part B Ratio | 100:25 to 100:33 | 100:25 to 100:33 |

Additives may further comprise chemical polymers or crosslinking agents.

Combined Components—Physical Properties

As described elsewhere herein, the present disclosure also embodies the combinations which correspond to those derivable from combining of the A-part and B-parts described elsewhere herein, whether or not the compositions are actually so derived. Again, it should be appreciated that any combination of compositional elements which provide for the same resulting mixtures, provided that such resulting mixture cures with the rates described herein and that such cured materials exhibit the superior physical attributes described herein.

Also, in certain embodiments, these mixture compositions include those in their various states of being pre-cured, partially cured, or post-cured.

In some embodiments, the mixed compositions, for example resulting from the mixing (and curing) of the corresponding A-part and B-part, cures to a Shore D hardness of at least 70 in less than 210 min, when cured room temperature, where room temperature is a temperature of from 15° to 25° C., and when tested using a durometer according to ASTM D2240. In other embodiments, the mixed compositions cure to a Shore D hardness of at least 70 in less than 200 min, in less than 190 min, in less than 180 min, in less than 170 min, in less than 160 min, in less than 150 min, in less than 140 min, in less than 130 min, or even in less than 120 minutes.

Additionally, in some embodiments, the cured composition exhibits a Shore D hardness in a range of from 70 to 75, from 75 to 80, from 80 to 85, from 85 to 90, or any combination of two or more of these ranges, when tested using a durometer according to ASTM D2240.

In still other independent embodiments, the cured composition exhibits a compression strength in a range of from 15 to 16, from 16 to 17, from 17 to 18, from 18 to 19, from 19 to 20, from 20 to 22, from 22 to 24, from 24 to 26, from 26 to 28, from 28 to 30 kilopound per square inch (ksi), or any combination of two or more of these ranges, when tested at 24° C. according to ASTM D695.

In still other independent embodiments, the cured composition exhibits a compression strength in a range of from 10 to 11, from 11 to 12, from 12 to 13, from 13 to 14, from 14 to 15, from 15 to about 20 kilopound per square inch (ksi), or any combination of two or more of these ranges, when tested at 88° C. according to ASTM D695.

In still other independent embodiments, the cured composition exhibits a compression modulus in a range of from 1100 to 1150, from 1150 to 1200, from 1200 to 1250, from 1250 to 1300, from 1300 to 1350, from 1350 to 1400, from 1400 to 1450, from 1450 to 1500, from 1500 to 1600, from 1600 to 1700 kilopound per square inch (ksi), or any combination of two or more of these ranges when tested at 24° C. according to ASTM D695.

In still other independent embodiments, the cured composition exhibits a compression modulus in a range of from 600 to 700, from 700 to 800, from 800 to 900, from 900 to 1000, from 1000 to 1100, from 1100 to 1200 kilograms per square inch (ksi), or any combination of two or more of these ranges when tested at 88° C. according to ASTM D695.

In still other independent embodiments, the cured composition exhibits a resistance to thermal cycling with little or no cracking visible to the unaided eye for the following thermal cycling conditions: 12 hours of 49° C. condensing humidity, followed by 1 hour @ −55° C., followed by 400 thermal cycles between −55° C. and 71° C. at 36 minutes per cycle, and repeat process 5 times for a total of 2,000 cycles.

Methods of Using

The disclosed composition is useful in many applications, such as bonding together substrates, at least one of which is constructed of a metal or a composite. In preferred embodiments, the compositions are used as shims, designed to fill small gaps in load-bearing aero-structure applications in order to reduce stress and premature fatigue cracking of the assembly. It is in these applications that the physical properties and fast cure times find particular benefit.

The present disclosure also provides processes for using the inventive compositions. For instance, in one such process, the composition is applied onto a surface of a first substrate, and thereafter a surface of a second substrate is mated in abutting relationship with the composition-applied first substrate to form an assembly. The mated assembly is then maintained in the abutting relationship for a time sufficient to allow the composition to cure. In an alternative process, the composition is applied onto a surface of at least one of a first substrate or a second substrate, and each of the composition-applied substrate(s) is maintained away from the other substrate for a time sufficient to allow the composition to cure to some extent. Then, the substrates are mated in abutting relationship to form an assembly.

In yet another alternative process, a first substrate is mated in spaced apart relationship with a second substrate, and within the space the composition is applied or dispensed. The assembly of the first substrate and the second substrate is then maintained in the relationship for a time sufficient to allow the composition to cure.

Stated otherwise, the compositions are simply delivered to an interface between two or more substrates and the composition is allowed to cure. The low viscosity of the as-mixed materials provides sufficient fluidity to allow the as-mixed material to penetrate internal volumes (e.g., crevices) and take the shape of those volumes before curing. The relatively fast cure times provides that the set-up time is minimized.

The amount of composition applied to a substrate surface should be suitably adjusted depending on the nature and dimensions of the substrate and the demands of the application at hand.

As described elsewhere herein, compositions of the present disclosure may ordinarily be cured under conditions ambient to the end users environment and above, after application onto the desired substrate. In addition, those persons of ordinary skill in the art may render the inventive compositions curable when exposed to radiation in the electromagnetic spectrum, such as UV, VIS, IR, E-beam, radio frequency, and in that event one may wish to include a photoinitiator to facilitate the reaction.

Kits

The present disclosure further contemplates kits for storing and delivering the disclosed compositions, especially where the compositions comprise two-part (e.g., A-part and B-part) compositions. In certain embodiments such a kit comprises any of the two-part, room-temperature curable compositions described herein, for example where the A-part and B-part of the composition are stored separately from one another. Such kits may further or alternatively comprise a barrier kit, clip pack, pint kit, gallon kit, quart kit, gallon kit, 5 gallon kit, gram kit, dual cartridge, or injection kit.

Assemblies

The present disclosure also includes those assemblies comprising the compositions described herein. The liquid shims are used to eliminate gaps less than 3 millimeters accommodating an imperfect fit between aerospace bolted joints (see FIG. 1), between carbon-fiber composites and aluminium alloy, composites and composites, aluminum alloy and aluminum alloy. It is commonly used in composite rib-to-skin assembly and other load bearing structures.

The following listing of Embodiments is intended to complement, not displace or supersede, the previous descriptions:

Embodiment 1. A two-part, room-temperature curable composition comprising:
 (a) an A-part composition, comprising:
  (i) a (meth)acrylic acid/(meth)acrylate resin component;
  (ii) an epoxy curative; and
  (iii) optional additives; and
 (b) a B-part compositions comprising
  (iv) an epoxy resin component;
  (v) a (meth)acrylic acid/(meth)acrylate polymerization initiator; and
  (vi) optional additives;
which either A-part or B-part, or both A-part and B-part comprise additive(s), which when mixed provides a fast curing, co-curable composition.

Embodiment 2. The curable composition of Embodiment 1, wherein the relative proportion of the A-part composition and the B-part composition is in a range of from 95/5 wt % to 5/95 wt %, preferably from 60/40 to 90/10 wt %, preferably from 70/30 wt % to 85/15 wt %, more preferably from 75/25 wt % to 80/20 wt %.

Embodiment 3. The curable composition of Embodiment 1 or 2, wherein the (meth)acrylic acid/(meth)acrylate resin component in A-part composition comprises at least one acid functional (meth)acrylate and/or (meth)acrylate ester, and at least one di(meth)acrylate, tri(meth)acrylate, and/or tetra(meth)acrylate. Such materials are described in detail elsewhere herein.

Embodiment 4. The curable composition of any one of Embodiments 1 to 3, wherein the at least one acid functional (meth)acrylate and/or (meth)acrylate ester is represented by $H_2C=CGCO_2R^1$, wherein G is a member selected from the group consisting of H, halogen and alkyl having from 1 to about 4 carbon atoms, and $R^1$ is hydrogen, alkyl, cycloalkyl, alkenyl, cycloalkenyl, alkaryl, or an aryl group having from 6 to about 16 carbon atoms, with or without substitution or interruption by a member selected from the group consisting of carboxylic acid, sulfonic acid, phosphoric acid, phosphinic acid, phosphonic acid, phenol, thiol, enol, silane, silicon, oxygen, halogen, carbonyl, hydroxyl, ester, urea, urethane, carbamate, amine, amide, sulfur, sulfonate and sulfone, phosphorus.

Embodiment 5. The curable composition of any one of Embodiments 1 to 4, wherein the acid functional (meth)acrylate comprises (meth)acrylic acid.

Embodiment 6. The curable composition of any one of Embodiments 1 to 5, wherein the di(meth)acrylate comprises ethoxylated (2) bisphenol A di(meth)acrylate.

Embodiment 7. The curable composition of any one of Embodiments 1 to 6, wherein the A-part composition comprises at least about 10 wt % of the (meth)acrylic acid/(meth)acrylate resin component, preferably at least about 12 wt %, more preferably about 12 wt % to 40 wt %.

Embodiment 8. The curable composition of any one of claims 1 to 7, wherein the (meth)acrylic acid/(meth)acrylate resin component further comprises an accelerator for curing the (meth)acrylic acid/(meth)acrylate resin component, preferably a free radical accelerator.

Embodiment 9. The curable composition of any one of Embodiments 1 to 8, wherein the A-part composition comprises at least one epoxy curative. In certain preferred Aspects of this Embodiment, the epoxy curative is one or more phosphorus-containing compound and may be any derivative of phosphinic acid, phosphonic acid or phosphoric acid having at least one P—OH group and at least one organic moiety characterized by the presence of an olefinic group. A preferred phosphorus-containing compound is phosphoric acid 2-hydroxyethyl methacrylate ester.

Embodiment 10. The curable composition of any one of Embodiments 1 to 9, wherein the A-part composition comprises up to about 85 wt % additives, preferably up to about 75 wt % additives, more preferably in a range of from about 60 wt % to about 85 wt % additives.

Embodiment 11. The curable composition of any one of Embodiments 1 to 10, wherein the epoxy resin component of the B-part composition comprises at least one of a $C_{4-28}$ alkylene diglycidyl ether, a $C_{2-28}$ alkylene- and/or alkenylene-diglycidyl ester; a $C_{2-28}$ alkylene-, mono- and polyphenol glycidyl ether; a polyglycidyl ether of trimethylol propane, pyrocatechol, resorcinol, hydroquinone, 4,4',4"-trihydroxyphenyl methane, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, or tris(4-hydroxyphenyl)methane; a bisphenol-A diglycidyl ether epoxy resin; bisphenol-F diglycidyl ether epoxy resin; a diglycidyl novalac epoxy resin; or a methylenebis(naphthalene)-diol, -triol, or -tetrol, 2,7,2',7'-tetraglycidyloxynaphthalene methane and/or 1,1,2,2-tetrakis(4-glycidyloxyphenyl)ethane, polyglycidyl ethers of the chlorination and bromination products of the above-mentioned diphenols, polyglycidyl ethers of novolacs, polyglycidyl ethers of polyphenols obtained by condensing phenols and long-chain halogen paraffins containing at least two halogen atoms; N,N'-diglycidyl-aniline, N,N'-dimethyl-N,N'-diglycidyl-4, 4'-diaminodiphenyl methane, N,N,N'N,-tetraglycidyl-4,4'-diaminodiphenyl methane, N,N'-diglycidyl-4-aminophenyl glycidyl ether, N,N,N'N'-tetraglycidyl-1,3-propylene bis-4-aminobenzoate, phenol novolac epoxy resin, cresol novolac epoxy resin sorbitol glycidyl ether, and combinations thereof.

Embodiment 12. The curable composition of any one of Embodiments 1 to 11, wherein the B-part composition comprises bisphenol-A diglycidyl ether epoxy resin.

Embodiment 13. The curable composition of any one of Embodiments 1 to 11, wherein the B-part composition comprises a tetraglycidyl and/or triglycidyl resin, preferably with aromatic rings.

Embodiment 14. The curable composition of any one of Embodiments 1 to 11, wherein the B-part composition comprises a 2,7,2',7'-tetraglycidyloxynaphthalene methane, 1,1,2,2-Tetrakis(4-glycidyloxyphenyl)ethane, and/or a triglycidyl derivative of 4,4',4''-trihydroxyphenyl methane.

Embodiment 15. The curable composition of any one of Embodiments 1 to 14, wherein the B-part composition comprises (meth)acrylic acid/(meth)acrylate polymerization initiator, preferably an organic peroxide, more preferably a benzoyl peroxide. In certain Aspects of this Embodiment, the composition contains no transition metal complex initiators.

Embodiment 16. The curable composition of any one of Embodiments 1 to 15, wherein the additives in either A-part or B-part, or both A-part and B-part composition comprise one or more of fillers, tougheners, or pigments, for example titania pigments, fumed and/or fused silica, ceramic microspheres, silicates (e.g., mica), aluminum powder, chopped carbon fibers.

Embodiment 17. The curable composition of any one of Embodiments 1 to 16, wherein the additives comprises at least one filler in a range of from 15 to 90 wt %, preferably from 60 to 85 wt % relative to the total weight of the A-part and B-part composition, the at least one filler comprising
(i) at least one sub-micron filler having a particle size in a range of from 0.1 to 0.5 microns, preferably from 0.2 microns to 0.3 microns, present in a range of from 0 to 5 wt %, preferably from 0.01 to 3 wt %, relative to the total weight of the A-part composition;
(ii) at least one mid-sized filler having a particle size in a range of from 1 micron to 10 microns, preferably from about 2.5 to about 7.5 microns, present in a range of from 0 to 10 wt %, preferably from 4 to 8 wt %, relative to the total weight of the A-part composition;
(iii) at least one larger-sized filler having a particle size in a range of from 20 to 50 microns, preferably from 20 to 35 microns, present in a range of from 20 to 50 wt %, preferably from 25 to 35 wt %, relative to the total weight of the A-part composition; and
(iv) at least one chopped fiber, preferably carbon fiber, having a length in a range of from 25 to 200 microns, preferably from 50 to 150 micron, present in a range of from 0 to 10 wt % preferably from 5 to 10 wt %, relative to the total weight of the A-part composition.

Embodiment 18. The curable composition of any one of Embodiments 1 to 17, wherein the composition is characterized by a composition of Column A or Column B.

| Raw Material | Column A Relative to Total Ratio [% wt] | Column B Relative to Part A/B Ratio [% wt] |
| --- | --- | --- |
| Part A | | |
| (Meth)acrylic Acid/Ester | 5-20 wt % | 5-30 wt % |
| Ethoxylated dimethacrylate | 5-20 wt % | 5 to 25 wt % |
| Free radical acrylate accelerator | 1 to 2 wt % | 1 to 3 wt % |
| phosphoric acid containing methacrylate ester epoxy curative | 5 to 10 wt % | 6 to 15 wt % |
| Titania, 0.2 um | 0 to 2 wt % | 0 to 3 wt % |
| Fumed silica 0.2-0.3 ums | 0 to 4 wt % | 0 to 6 wt % |
| Silica fused 3-7 ums | 2 to 10 wt % | 3 to 12 wt % |
| Microspheres 12-26 ums | 6-15 | 7 to 18 wt % |
| Fused silica 23-30 um or Spheroidal Al Powder, 23 um | 0 to 20 wt % | 0 to 30 wt % |
| Mica, 33 um | 5 to 10 wt % | 5 to 15 wt % |
| Chopped Fiber, 45-150 um | 0 to 8 wt % | 0 to 12 wt % |
| Part A Total | 75 to 80 wt % | |
| Part B | | |
| Toughener dispersed in epoxy resin | 5 to 10 wt % | 26-39 |
| Diglycidyl aromatic epoxy resin | 5 to 10 wt % | 20-30 |
| Tetraglycidyl aromatic epoxy resin | 3 to 6 wt % | 16-23 |
| BPO 75%/in diglycidyl epoxy resin | 5 to 10 wt % | 24-35 |
| Part B Total | 20-25 wt % | |
| Part A Part B Total | 100 | 100 |
| Part A:Part B Ratio | 100:25 to 100:33 | 100:25 to 100:33 |

Embodiment 19. A composition resulting from the mixing of the curable composition of any one of Embodiments 1 to 18. In certain aspects of this Embodiment, the mixed composition may be described as a pre-cured, partially cured, or post-cured composition.

Embodiment 20. A kit comprising the two-part, room-temperature curable composition of any one of Embodiments 1 to 18, where the A-part and B-part of the composition are stored separately from one another.

Embodiment 21. The kit of Embodiments 20, wherein the kit comprises barrier kit, clip pack, pint kit, gallon kit, quart kit, gallon kit, 5 gallon kit, gram kit, dual cartridge, injection kit.

Embodiment 22. A method comprising delivering the composition of Embodiments 21 to an interface between two or more substrates and allowing the composition to cure.

Embodiment 23. A method for delivering the composition of Embodiments 21 to an interface between two or more substrates and allowing the composition to cure, comprising the steps of:
(a) applying the composition onto a surface of at least one of the two or more substrates;
(b) mating a surface of a second substrate in abutting relationship with the composition-applied first substrate to form an assembly; and
(c) maintaining the assembly in the mated abutting relationship for a time sufficient to allow the composition to cure.

Embodiment 24. A cured composition resulting from the mixing and curing of the curable composition of any one of Embodiments 1 to 19 that cures to a Shore D hardness of at least 70 in less than 210 min, 200 min, 190 min, 180 min, 170 min, 160 min, 150 min, 140 min, 130 min, or 120 minutes, when cured room temperature, where room temperature is a temperature of from 15° to 25° C., and when tested using a durometer according to ASTM D2240.

Embodiment 25. A cured composition resulting from the mixing and curing of the curable composition of any one of Embodiments 1 to 19 that exhibits any one or more of:
(a) a Shore D hardness in a range of from 70 to 75, from 75 to 80, from 80 to 85, from 85 to 90, or any combination of two or more of these ranges, when tested using a durometer according to ASTM D2240;
(b) a compression strength in a range of from 15 to 16, from 16 to 17, from 17 to 18, from 18 to 19, from 19 to 20, from 20 to 22, from 22 to 24, from 24 to 26, from 26 to 28, from 28 to 30 kilopound per square inch (ksi), or any combination of two or more of these ranges, when tested at 24° C. according to ASTM D695;

(c) a compression strength in a range of from 10 to 11, from 11 to 12, from 12 to 13, from 13 to 14, from 14 to 15, from 15 to about 20 kilopound per square inch (ksi), or any combination of two or more of these ranges, when tested at 88° C. according to ASTM D695;

(d) a compression modulus in a range of from 1100 to 1150, from 1150 to 1200, from 1200 to 1250, from 1250 to 1300, from 1300 to 1350, from 1350 to 1400, from 1400 to 1450, from 1450 to 1500, from 1500 to 1600, from 1600 to 1700 kilopound per square inch (ksi), or any combination of two or more of these ranges when tested at 24° C. according to ASTM D695;

(e) a compression modulus in a range of from 600 to 700, from 700 to 800, from 800 to 900, from 900 to 1000, from 1000 to 1100, from 1100 to 1200 kilograms per square inch (ksi), or any combination of two or more of these ranges when tested at 88° C. according to ASTM D695; or (f) Thermal cycling resistance with little or no cracking visible to the unaided eye for the following thermal cycling conditions: 12 hours of 49° C. condensing humidity, followed by 1 hour @ −55° C., followed by 400 thermal cycles between −55° C. and 71° C. at 36 minutes per cycle, and repeat process 5 times for a total of 2,000 cycles.

Embodiment 26. An A-part composition, comprising:
(i) a (meth)acrylic acid/(meth)acrylate resin component;
(ii) an epoxy curative initiator; and
(iii) optional additives,
as characterized in any one of Embodiments 3 to 10, 16 to 18.

Embodiment 27. A B-part composition comprising:
(iv) an epoxy resin component;
(v) (meth)acrylic acid/(meth)acrylate curative initiator; and
(vi) optional additives;
as characterized in any one of Embodiments 11 to 18.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein. In fact, it should be appreciated that variances on the described compositions are within the scope of the present disclosure. For example, where one or more (meth)acrylic acid/(meth)acrylate ester is described at a given concentration, other (meth)acrylic acids/(meth)acrylate esters as described herein may be substituted in whole or in part, at concentrations within 25% of the concentrations described. Likewise for other ingredients (e.g., epoxies) or additives. For example, where one sub-micron filler, mid-sized filler, larger sized filler, or chopped fiber is exemplified, other similarly characterized materials may be substituted in whole or in part in their stead, at concentrations at least within 10%, 15%, 20%, 25%, or 50% of the cited concentration. Each variation constitutes an independent embodiment of the present disclosure.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

Example 1: Preparation of Samples

In some experiments, two-part, room temperature curable epoxy/(meth)acrylate compositions in accordance with this invention were prepared by combining Part A and Part B in the correct ratio and mixed thoroughly. See Table 1A and Table 1B.

TABLE 1A

| Raw Material | Hybrid-31 Ratio [% wt] | Hybrid-37 Ratio [% wt] | Hybrid-40-2 Ratio [% wt] | Hybrid-32-1 Ratio [% wt] |
|---|---|---|---|---|
| Part A | | | | |
| Methacrylic Acid | 8.58 | 9.28 | 0.00 | 0.00 |
| Acrylic Acid | 0.00 | 0.00 | 8.78 | 0.00 |
| Isobornyl Methacrylate | 0.00 | 0.00 | 0.00 | 12.94 |
| SR348 | 12.87 | 13.92 | 13.17 | 8.62 |
| Pergaquik A150 | 1.26 | 1.36 | 1.29 | 1.27 |
| Harcryl 1228 | 7.43 | 8.03 | 7.60 | 7.46 |
| Tronox CR 813 | 0.86 | 0.79 | 0.88 | 0.87 |
| Cab O Sil TS 720 | 2.28 | 2.08 | 0.00 | 1.79 |
| Silica fused GP 3 I | 5.26 | 4.78 | 5.38 | 5.29 |
| Microspheres G600 | 6.97 | 6.33 | 7.13 | 7.00 |
| Teco-Sil grains 200F | 18.99 | 0.00 | 19.43 | 19.08 |
| Al Powder | 0.00 | 17.25 | 0.00 | 0.00 |
| Mica WG 325 | 6.85 | 6.23 | 7.01 | 6.89 |
| Panex MFB 150 microns | 5.93 | 5.39 | 6.07 | 5.96 |
| Part A Total | 77.29 | 75.43 | 76.75 | 77.17 |
| Part B | | | | |
| Kane Ace MX-236 | 6.94 | 7.51 | 7.10 | 6.98 |
| DER 331 | 5.36 | 5.80 | 5.49 | 5.39 |
| Epiclon HP 4710 | 4.10 | 4.44 | 4.20 | 4.12 |
| BPO 75%/Epon 826 | 6.31 | 6.82 | 6.46 | 6.34 |
| Part B Total | 22.71 | 24.57 | 23.25 | 22.83 |
| Part A Part B Total | 100 | 100 | 100 | 100 |
| Part A:Part B Ratio | 100:29 | 100:33 | 100:30 | 100:30 |

TABLE 1B

| Raw Material | Hybrid 14-2 Ratio [% wt] | Hybrid 14-4 Ratio [% wt] | Hybrid 27 Ratio [% wt] |
|---|---|---|---|
| Part A | | | |
| Methacrylic Acid | 8.58 | 0.00 | 0.00 |
| Acrylic Acid | 0.00 | 8.58 | 4.74 |
| TMPTMA | 0.00 | 0.00 | 4.73 |
| SR348 | 12.87 | 12.87 | 4.36 |
| Pergaquik A150 | 1.26 | 1.26 | 0.91 |
| Harcryl 1228 | 7.43 | 7.43 | 7.66 |

TABLE 1B-continued

| Raw Material | Hybrid 14-2 Ratio [% wt] | Hybrid 14-4 Ratio [% wt] | Hybrid 27 Ratio [% wt] |
|---|---|---|---|
| Tronox CR 813 | 0.00 | 0.00 | 0.00 |
| Cab O Sil TS 720 | 1.26 | 1.26 | 0.00 |
| Silica fused GP 3 I | 0.00 | 0.00 | 0.00 |
| Microspheres G600 | 5.02 | 5.02 | 5.18 |
| Microspheres G 400 | 3.95 | 3.95 | 4.07 |
| Microspheres G 200 | 4.88 | 4.88 | 5.04 |
| Teco-Sil grains 200F | 0.00 | 0.00 | 0.00 |
| Al Powder | 16.57 | 16.57 | 17.09 |
| Mica WG 325 | 0.00 | 0.00 | 0.00 |
| Panex MFB 150 microns | 0.00 | 0.00 | 0.00 |
| Admafine AO509 | 7.89 | 7.89 | 0.00 |
| Admafine AC 9500-SI | 7.57 | 7.57 | 15.95 |
| Part A Total | 77.29 | 77.29 | 69.73 |
| Part B | | | |
| Kane Ace MX-236 | 6.94 | 6.94 | 7.16 |
| DER 331 | 5.36 | 5.36 | 5.53 |
| Epiclon HP 4710 | 4.10 | 4.10 | 4.23 |
| BPO 75%/Epon 826 | 6.31 | 6.31 | 5.53 |
| SR348 | 0.00 | 0.00 | 7.81 |
| Part B Total | 22.71 | 22.71 | 30.27 |
| Part A + Part B Total | 100 | 100 | 100 |
| Part A:Part B ratio | 100:29 | 100:29 | 100:43 |

In Tables 1A and 1B, the structures of each component may be described as:

Methacrylic acid (methacrylate monomer, acid containing methacrylate):

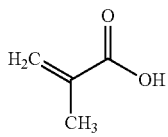

Acrylic acid (acrylate monomer, acid containing methacrylate)

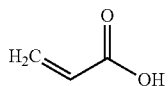

Isobornyl methacrylate (methacrylate monomer)

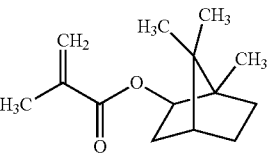 [SMILES: C=C(C)C(=O)OC1CC2CCC1(C)C2(C)C]

TMPTMA: Trimethylolpropane trimethacrylate

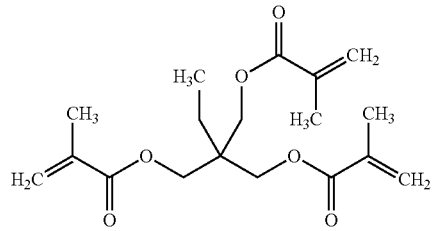 [SMILES: C=C(C)C(=O)OCC(CC)(COC(=O)C(=C)C)COC(=O)C(=C)C]

SR348 (methacrylate crosslinker): ethoxylated (2) bisphenol A dimethacrylate

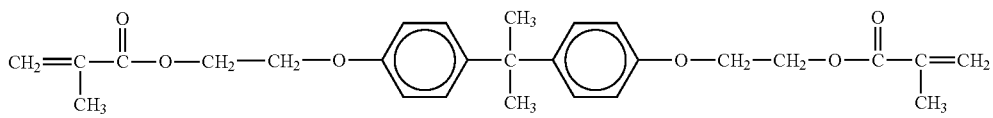

Pergaquik A150 (Free radical accelerator for curing of methacrylate): 2,2'-(4-Methylphenylimino)diethanol

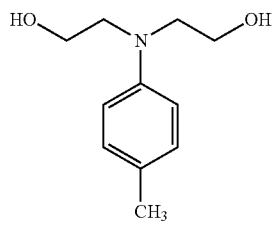

Harcryl 1228 (epoxy curative): Phosphoric acid 2-hydroxyethyl methacrylate ester

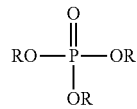

R = *—H
and/or
R =

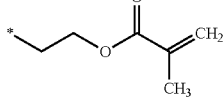

Tronox CR 813: Titanium dioxide TiO$_2$ pigment. Typical Average particle size: 0.21 μm Cab O Sil TS 720: Fumed silica, used for rheology control, and provides sag resistance to the formulations. Average particle length: 0.2-0.3 μm.

Silica fused GP 3 I: Fused silica. Average particle size: 3.0-7.0 μm

Microspheres G600: Also called: Zeeospheres Ceremic Microspheres G600; Shape: Hollow spheres with thick walls; Composition: Silica-Alumina Ceramic; Average Particle size at 90th percentile: 18.0-26.0 μm Microspheres G400: Also called: Zeeospheres Ceremic Microspheres G400; Shape: Hollow spheres with thick walls; Composition: Silica-Alumina Ceramic; Average Particle size at 90th percentile: 18 μm Microspheres G200: Also called: Zeeospheres Ceremic Microspheres G200; Shape: Hollow spheres with thick walls; Composition: Silica-Alumina Ceramic; Average Particle size at 90th percentile: 12 μm Teco-Sil grains 200F: Fused silica. Typical average particle size: 23-30 μm Aluminum Powder: Spheroidal aluminum powder in average particle size of 22.708 μm Mica WG 325: Muscovite Mica, KAl$_2$Si$_3$O$_{10}$(OH)$_2$·5H$_2$O; Typical Average particle size: 33 μm Panex MFB 150 microns: Chopped carbon fiber. Fiber length: 50-150 μm Admafine AO509—10 μm aluminium oxide; 75 μm cut, no surface treatment.

AC9500-SI: 8 μm aluminium oxide, 45 μm cut, surface treated by blocking on high reactive —OH on alumina surface. This is one of surface treatment, but the normal reactive —OH are still on alumina surface.

Kane Ace MX-236 (toughener dispersed in epoxy resin): 15% concentration of 100 nm PBd CSR particles in epoxy resin Tactix 742 (modified)

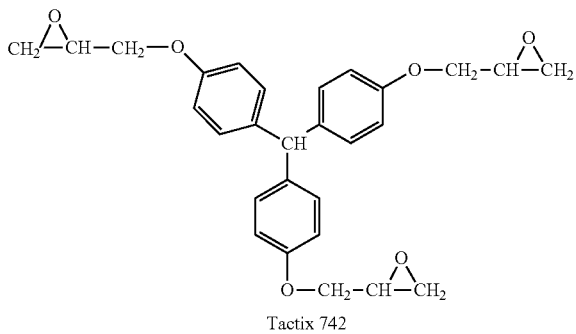 [SMILES: c1cc(C(c2ccc(OCC3CO3)cc2)c2ccc(OCC3CO3)cc2)ccc1OCC1CO1]

Tactix 742

DER 331 (epoxy resin)

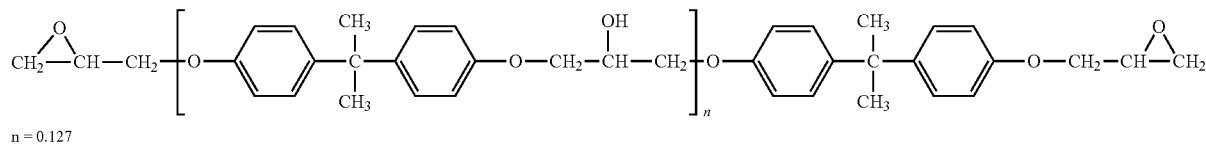

n = 0.127

Epiclon HP 4710 (epoxy resin)

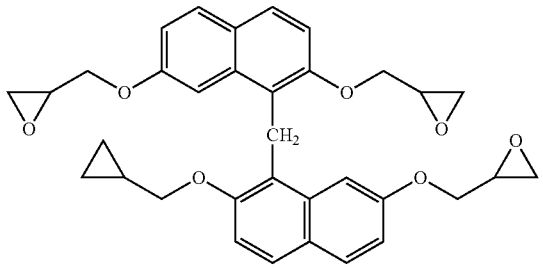 [SMILES: c1cc2ccc(OCC3CC3)c(Cc3c(OCC4CO4)ccc4ccc(OCC5CO5)cc34)c2cc1OCC1CO1]

Epon 826 (epoxy resin)

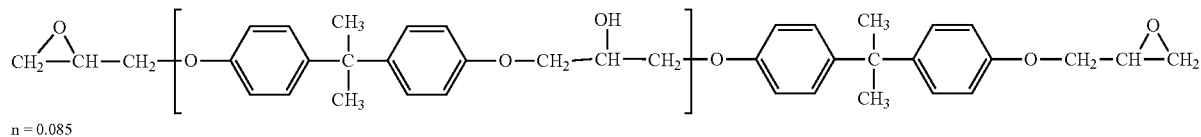

n = 0.085

BPO ((meth)acrylate curing initiator): benzoyl peroxide

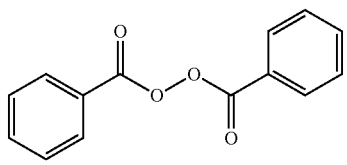 [SMILES: O=C(OOC(=O)c1ccccc1)c1ccccc1]

Example 2: Fast Cure Rate at Room Temperature

Figure 2:
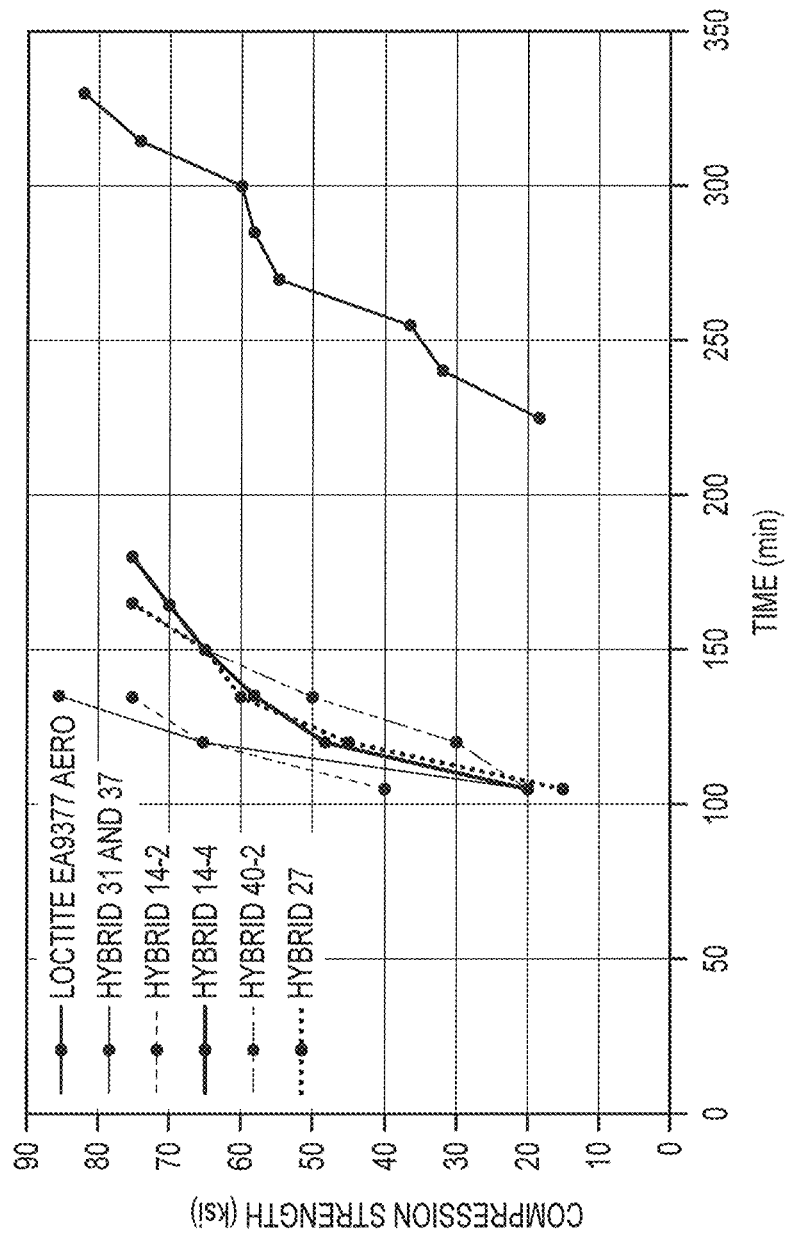
FIG. 2 shows exemplary relative cure times of several inventive composition vs. that of LOCTITE-branded EA9377 AERO, as measured by the development of Shore D Hardness as a function of time.
Figure 3:
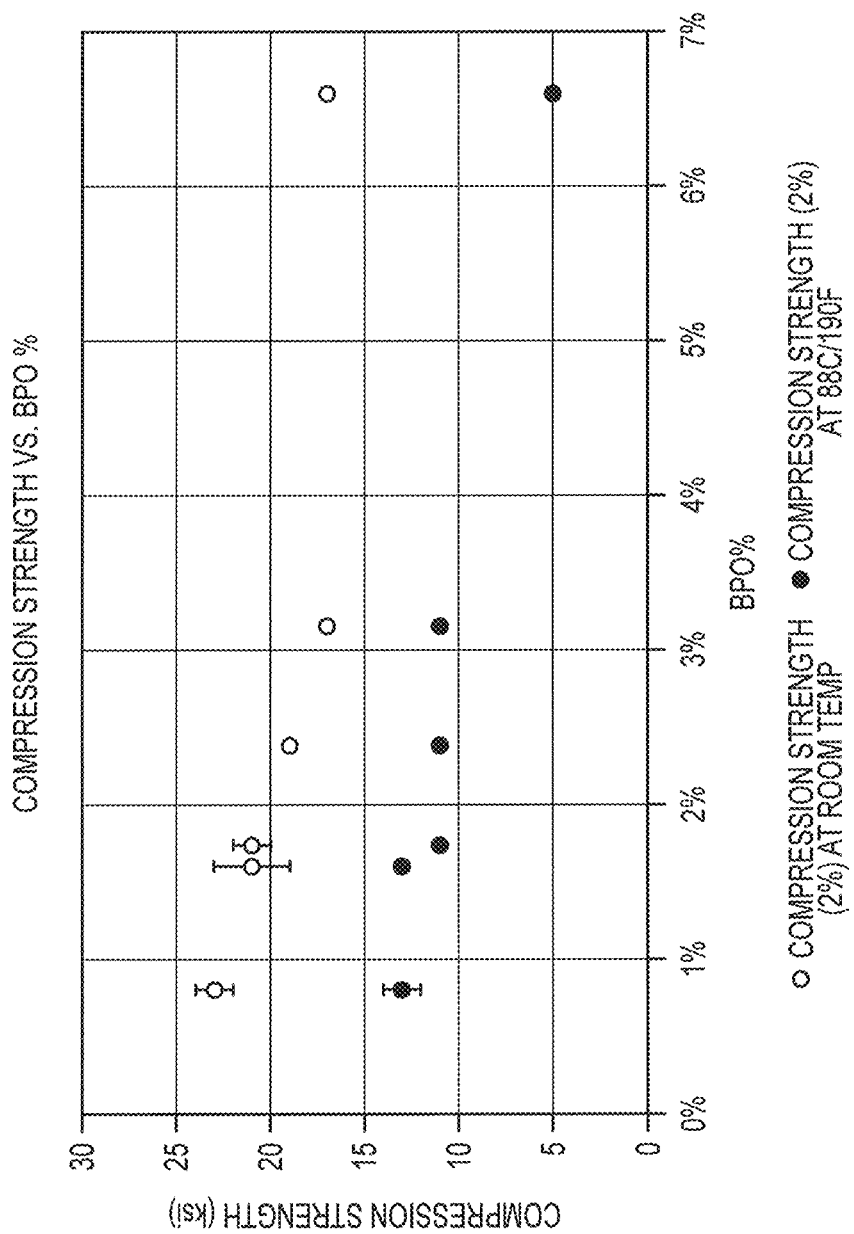
FIG. 3 shows the effect of free radical initiator (BPO) concentration on compression strength. Top line data shows compression strength (2%) at room temperature and bottom line data shows compression strength (2%) at 88° C./190° F. The balance of the composition is consistent with Hybrid 31 and 37 compositions (Table 1A).
Figure 4:
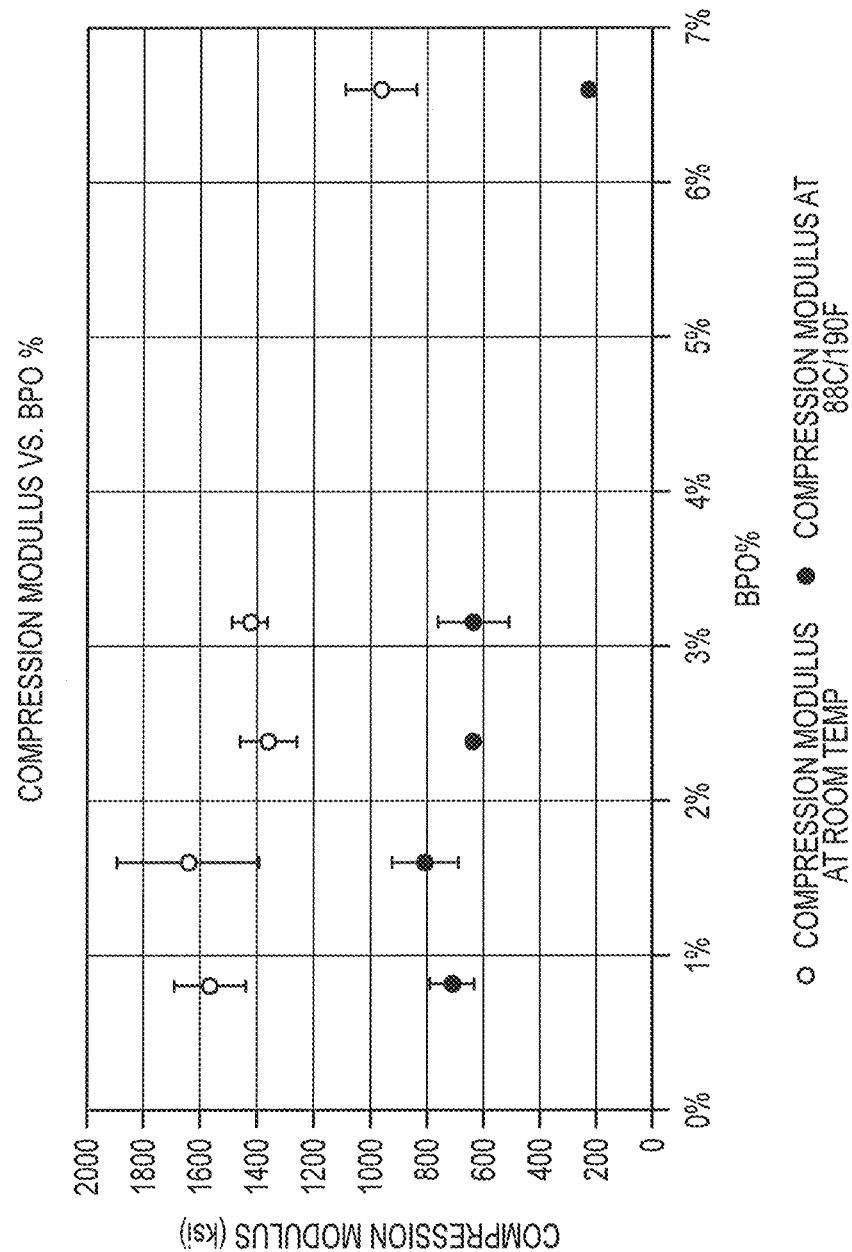
FIG. 4 shows the effect of free radical initiator (BPO) concentration on compression modulus. Top line data shows compression modulus at room temperature and bottom line data shows compression modulus at 88° C./190° F. The balance of the composition is consistent with Hybrid 31 and 37 compositions (Table 1A).
Figure 5:
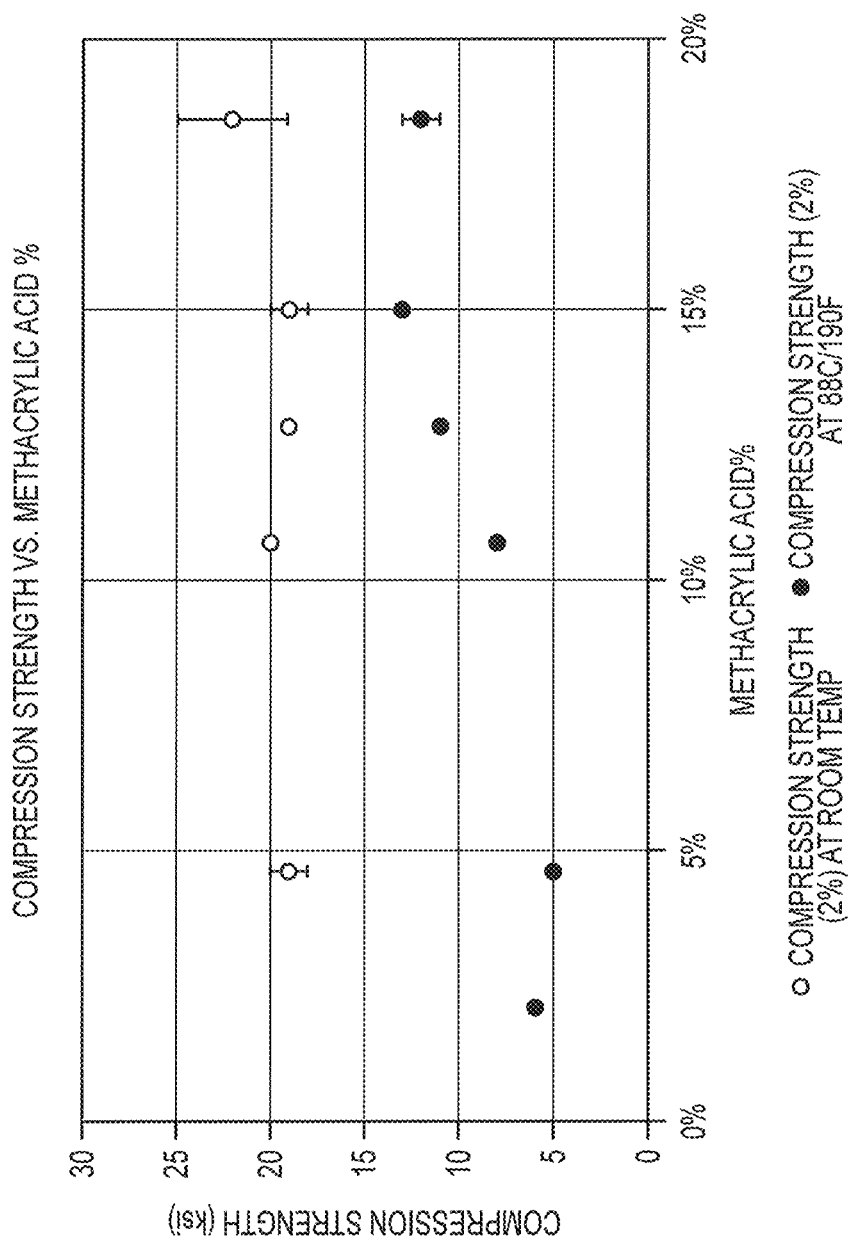
FIG. 5 shows the effect of (meth)acrylic acid content on compression strength. Top line data shows compression strength (2%) at room temperature and bottom line data shows compression strength (2%) at 88° C./190° F. The balance of the composition is consistent with Hybrid 31 and 37 compositions (Table 1A).
Figure 6:
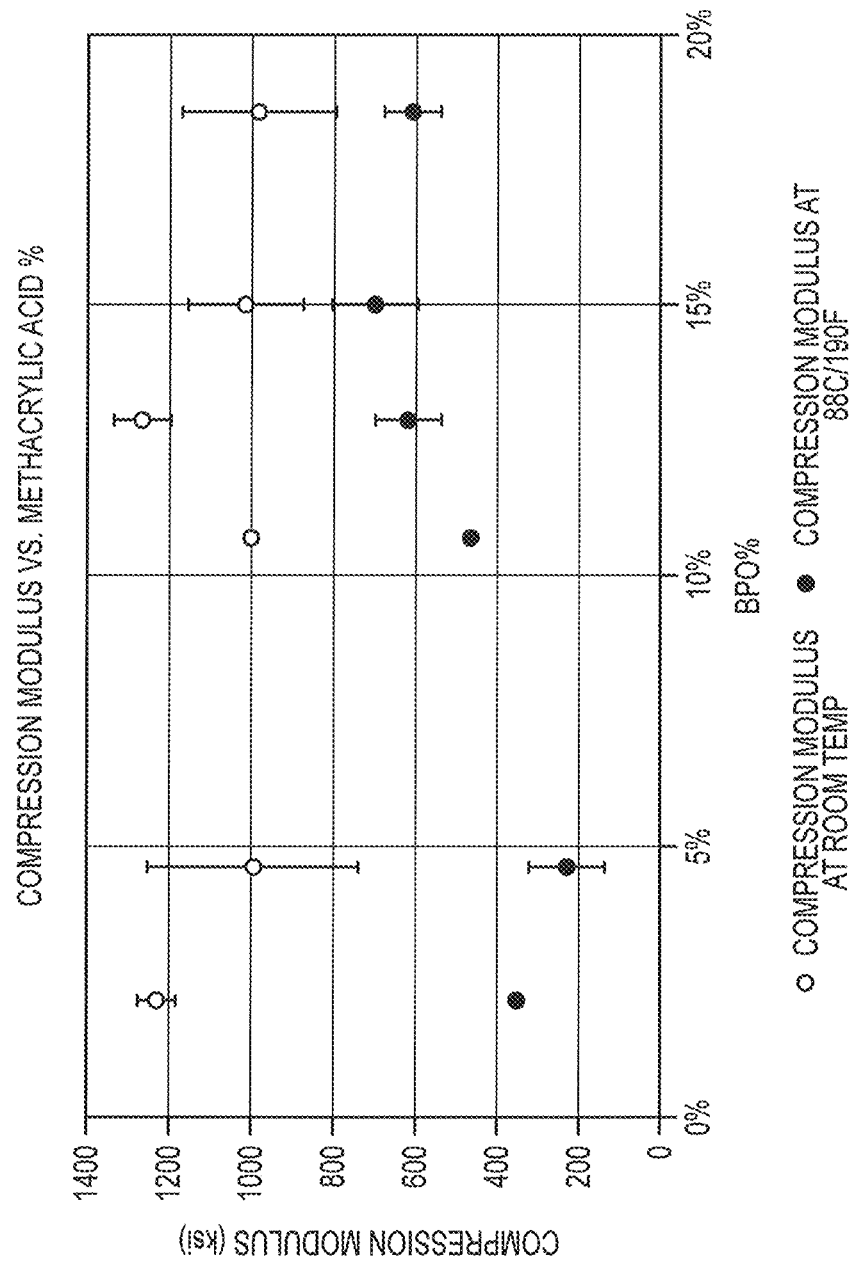
FIG. 6 shows the effect of (meth)acrylic acid content on compression modulus. Top line data shows compression modulus at room temperature and bottom line data shows compression modulus at 88° C./190° F. The balance of the composition is consistent with Hybrid 31 and 37 compositions (Table 1A).

Cure time of the liquid shim materials was tested using the overall hardness improvement over time. When the hardness reaches Shore D 75, the material is considered solid and resistant to mechanical shocks and movement. The cure time results from this hardness test are summarized in Table 2 and FIG. 2 and compared with legacy liquid shim product EA9377. It can be seen that the hybrid shim materials cured within 3.5 hrs at room temperature to achieve Shore D 75 hardness, while EA 9377 took 5 hrs 15 mins to cure to the same levels.

eter and 1 inch (25.4 mm) in length per ASTM D695 using 0.05±0.010 inch/min (0.127±0.025 cm/min) cross head travel speed. Strain was determined using a laser extensometer. These methods and test conditions form the basis of the values for compressive properties described in this application.

TABLE 3

Compressive properties of hybrid shim materials

| Property | Test Condition | LOCTITE EA 9377 AERO | Hybrid shim 14-2 | Hybrid shim 14-4 | Hybrid shim 37 | Hybrid shim 39 | 3M™ Scotch-Weld™ Advanced Liquid Shim EC-7272 B/A | Huntsman paste adhesive NHPA |
|---|---|---|---|---|---|---|---|---|
| Compressive Strength (ksi) | 75° F. (24° C.) | 20 | 28 | 24 | 22 | 26 | 11.5 | 11.0 |
|  | 176° F. (80° C.) | — | — | — | — | — | 6.4 | — |
|  | 190° F. (88° C.) | 13 | 15 | 10 | 14 | 14 | — | — |
| Compressive Modulus (ksi) | 75° F. (24° C.) | 831 | 1426 | 1271 | 1148 | 1703 | 348.5 | 360 |
|  | 190° F. (88° C.) | 590 | 793 | 539 | 1297 | 1058 | 203.1 | — |

TABLE 2

Comparative curing rates for several inventive compositions vs. LOCTITE EA 9377 AERO, as measured by Shore D Hardness

| Time, min | LOCTITE EA 9377 AERO | Hybrid 31 | Hybrid 37 | Hybrid 14-2 | Hybrid 14-4 | Hybrid 27 | Hybrid 40-2 |
|---|---|---|---|---|---|---|---|
| 15-90 | 0 | | | | | | |
| 105 | 0 | 20 | 20 | 40 | 20 | 15 | 20 |
| 120 | 0 | 65 | 65 | 65 | 48 | 45 | 30 |
| 135 | 0 | 85 | 85 | 75 | 58 | 60 | 50 |
| 150 | 0 | | | | 65 | 65 | 65 |
| 165 | 0 | | | | 70 | 75 | 75 |
| 180 | 0 | | | | 75 | | |
| 195 | 0 | | | | | | |
| 210 | 0 | | | | | | |
| 225 | 18 | | | | | | |
| 240 | 32 | | | | | | |
| 255 | 36 | | | | | | |
| 270 | 55 | | | | | | |
| 285 | 58 | | | | | | |
| 300 | 60 | | | | | | |
| 315 | 74 | | | | | | |
| 330 | 82 | | | | | | |

Example 3: High Compressive Properties Across a Wide Temperature Range

The hybrid shim compositions showed high compressive properties at room temperature 75° F. (23.9° C.) as well as elevated temperature of 190° F. (87.8° C.) after full curing at room temperatures. The compositions also exhibited improved compressive modulus than Loctite EA 9377, and much higher compressive properties than 3M and Huntsman's fast cure liquid shim and paste adhesive products. The results are summarized in the Table 3 and FIGS. 3 to 6.

Figure 7:
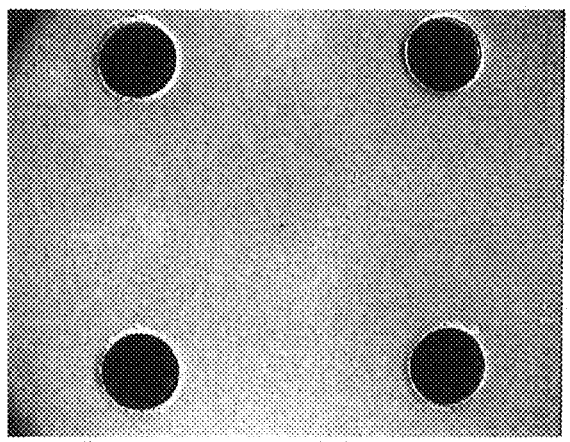
FIG. 7 shows a light microscopy picture of 90 mil (2.28 mm) thick bondline hybrid shim formulation 31 and 40-2/composite interface after thermal cycling test of 2000 cycles.
Figure 7:
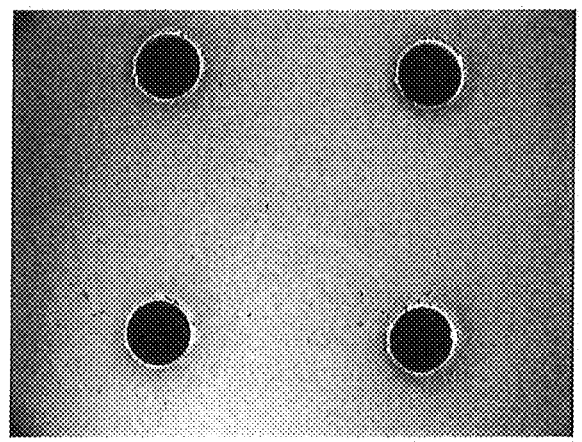

Compressive properties were tested on cured samples using cylindrical specimens of 0.5 inch (12.7 mm) in diam- Example 4: Thermal Cycling Resistance The hybrid materials of 90 mil (2.28 mm) thickness showed good thermal cycling performance and no visible cracks formation after 2000 cycles. The corresponding picture is shown in FIG. 7.

Thermal cycling test samples were prepared by curing hybrid materials between two composite panels with one of the panel pretreated with a mold releasing agent (Loctite Frekote 700-NC) before bonding. The dimension of the panel is 3 inch (7.62 cm) by 4 inch (10.16 cm). The hybrid shim's thickness was controlled with gauge strips along two sides of the panel to create samples of 90 mil (2.29 mm). After curing for 3-5 days at 77° F. (25° C.), the panels were drilled and six fasteners installed to create an assembly simulating the mechanical fastened joints in aircraft structure. The samples were subsequently subjected to the following thermal cycling conditions simulating service conditions:

12 hours of 120° F. (49° C.) condensing humidity 1 hour @ −67° F. (−55° C.)

400 thermal cycles between −67° F. (−55° C.) and 160° F. (71° C.) at 36 minutes per cycle Repeat process 5 times for a total of 2,000 cycles Thermal cycling was broken down into 400 cycle blocks. After every block the samples were examined for cracks and disbond under a microscope.

Example 5: Other Properties

Other properties of hybrid shim materials are shown in Table 4.

TABLE 4

Application time, cured density, hardness, and
flow properties of hybrid shim materials

| Property | Hybrid shim 31 | Hybrid shim 37 | Hybrid shim 40-2 | General |
|---|---|---|---|---|
| Application time, minutes from mixing to application at 75 ± 5° F. | 45-60 | 45-60 | 45 | 30-60 |
| Cured Density, lb/ft$^3$ | 92 | 95 | 96 | 90-100 |
| Hardness-Shore D at 9 hours | 90 | 90 | 90 | 70-100 |
| Hardness-Shore D at 24 hours | 90 | 90 | 90 | 70-100 |
| Flow, Inches | 0.10 | 0.15 | 0.15 | <0.2 |

Application time was measured on 100 g mass hybrid materials using Method-ASTM D2471 at room temperature.

Cured density was measured by a digital piconometer. Each cured specimen was weighed to the nearest hundredth of a gram. Volume of each specimen was determined and the cured density calculated.

Shore D hardness was measured in accordance with ASTM D 2240 at room temperature.

Flow (slump) properties: Part A and Part B of hybrid material were mixed thoroughly. Test well of a jig was filled using hybrid material right after mixing and the surface leveled. The jig was stood upright and hybrid material was pressed out. After 30 mins slump was measured.

As those skilled in the art will appreciate, numerous modifications and variations of the present invention are possible in light of these teachings, and all such are contemplated hereby.

The disclosures of each patent, patent application, and publication cited or described in this document are hereby incorporated herein by reference, in their entirety, or at least for their teachings in the context of their recitation.

What is claimed:

1. A two-part, room-temperature curable liquid-shim composition comprising:
   (a) an Apart composition, comprising:
      (i) a (meth)acrylic acid/(meth)acrylate resin component;
      (ii) an epoxy curative; and
   (b) a B-part composition comprising
      (iii) an epoxy resin component; and
      (iv) a (meth)acrylic acid/(meth)acrylate polymerization initiator;
   wherein
      subsequent to mixing, the two-part, room temperature curable composition is flowable in an uncured state;
      the relative proportion of the A-part composition and the B-part composition is in a range of from 70/30 wt % to 5/95 wt %;
      the (meth)acrylic acid/(meth)acrylate resin component in A-part composition comprises at least one acid functional (meth)acrylate and/or (meth)acrylate ester, and at least one di(meth)acrylate, tri(meth)acrylate, and/or tetra(meth)acrylate,
      the epoxy resin component in the B-part composition comprises at least one diglycidyl epoxy resin component, and at least one tri-glycidyl and/or tetra-glycidyl epoxy resin component; and
      which either A-part or B-part, or both A-part and B-part further comprise fillers, such that the fillers comprise,
      (a) at least one sub-micron filler having a particle size in a range of from 0.1 to 0.5 microns, or from 0.2 microns to 0.3 microns;
      (b) at least one mid-sized filler having a particle size in a range of from 1 micron to 10 microns;
      (c) at least one larger-sized filler having a particle size in a range of from 20 to 50 microns; and
      (d) at least one chopped fiber, having an average length in a range of from 25 to 200 microns;
      such that the weight ratio of sub-micron:mid-sized:larger particle size:chopped fiber ranges from 0 to 5 parts: from 0 to 10 parts:from 20 to 50 parts:from 0 to 10 parts by weight relative to the total weight of the fillers present in the total composition;
      wherein, subsequent to cure, the two-part, room temperature curable composition exhibits a Shore D hardness in a range of from 70 to 90 in less than 210 minutes, when tested using a durometer according to ASTM D2240.

2. The curable composition of claim 1, wherein the at least one di(meth)acrylate is an ethoxylated di(meth)acrylate, wherein a ratio of the least one (meth)acrylic acid and/or (meth)acrylate ester to the ethoxylated di(meth)acrylate is in a range of from 1:1.5 to 1.5:1.

3. The curable composition of claim 1, wherein the at least one acid functional (meth)acrylate and/or (meth)acrylate ester is represented by $H_2C$=$CGCO_2R^1$, wherein G is a member selected from the group consisting of H, halogen and alkyl having from 1 to about 4 carbon atoms, and $R^1$ is hydrogen, alkyl, cycloalkyl, alkenyl, cycloalkenyl, alkaryl, or an aryl group having from 6 to about 16 carbon atoms, with or without substitution or interruption by a member selected from the group consisting of carboxylic acid, sulfonic acid, phosphoric acid, phosphinic acid, phosphonic acid, phenol, thiol, enol, silane, silicon, oxygen, halogen, carbonyl, hydroxyl, ester, urea, urethane, carbamate, amine, amide, sulfur, sulfonate and sulfone, phosphorus.

4. The curable composition of claim 1, wherein the acid functional (meth)acrylate comprises (meth)acrylic acid.

5. The curable composition of claim 1, wherein the di(meth)acrylate comprises ethoxylated (2) bisphenol A di(meth)acrylate.

6. The curable composition of claim 1, wherein the A-part composition comprises at least about 10 wt % of the (meth)acrylic acid/(meth)acrylate resin component.

7. The curable composition of claim 1, wherein the (meth)acrylic acid/(meth)acrylate resin component further comprises an accelerator for curing the (meth)acrylic acid/(meth)acrylate resin component.

8. The curable composition of claim 1, wherein the at least one epoxy curative is one or more derivative of phosphinic acid, phosphonic acid or phosphoric acid having at least one P—OH group and at least one organic moiety characterized by the presence of an olefinic group.

9. The curable composition of claim 1, wherein the epoxy resin component of the B-part composition comprises at least one of a $C_{4-28}$ alkylene diglycidyl ether, a $C_{2-28}$ alkylene- and/or alkenylene-diglycidyl ester; a $C_{2-28}$ alkylene-, mono- and poly-phenol glycidyl ether; a polyglycidyl ether of trimethylol propane, pyrocatechol, resorcinol, hydroquinone, 4,4',4"-trihydroxyphenyl methane, 4,4'-dihydroxydiphenyl methane (or bisphenol F), 4,4'-dihydroxy-3, 3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4-dihydroxy-3,3'-dimethyldiphenyl propane, 4,4'-dihydroxydiphenyl sulfone, or tris(4-hydroxyphenyl)methane; a bisphenol-A diglycidyl ether epoxy resin; bisphenol-F diglycidyl ether epoxy resin; a diglycidyl novalac epoxy resin; or a methylenebis(naphthalene)-diol, -triol, or -tetrol, 2,7,2',7'-tetraglycidyloxynaphthalene methane and/or 1,1,2, 2-tetrakis(4-glycidyloxyphenyl)ethane, polyglycidyl ethers of the chlorination and bromination products of the above-mentioned diphenols, polyglycidyl ethers of novolacs, polyglycidyl ethers of polyphenols obtained by condensing phenols and long-chain halogen paraffins containing at least two halogen atoms; N,N'-diglycidyl-aniline, N,N'-dimethyl-N,N'-diglycidyl-4,4'-diaminodiphenyl methane, N,N,N'N,-tetraglycidyl-4,4'-diaminodiphenyl methane, N,N'-diglycidyl-4-aminophenyl glycidyl ether, N,N,N'N'-tetraglycidyl-1,3-propylene bis-4-aminobenzoate, phenol novolac epoxy resin, cresol novolac epoxy resin sorbitol glycidyl ether, and combinations thereof.

10. The curable composition of claim 1, wherein the B-part composition comprises bisphenol-A diglycidyl ether epoxy resin.

11. The curable composition of claim 1, wherein the B-part composition comprises a 2,7,2',7'-tetraglycidyloxynaphthalene methane, 1,1,2,2-Tetrakis(4-glycidyloxyphenyl)ethane, and/or a triglycidyl derivative of 4,4',4"-trihydroxyphenyl methane.

12. The curable composition of claim 1, wherein the B-part composition comprises diglycidyl:tri-glycidyl:tetraglycidyl epoxy resin components in a range of from 4 parts to 14 parts:from 4 parts to 10 parts:from 3 parts to 8 parts by weight, relative to the total epoxy resin.

13. The curable composition of claim 1, wherein the B-part composition comprises benzoyl peroxide.

14. The curable composition of claim 1, wherein the additives are contained in the A-part composition.

15. The curable composition of claim 1, wherein the weight ratio of sub-micron:mid-sized:larger particle size:chopped fiber range are in a range of from 0.01 to 3 parts:from 4 to 8 parts:from 25 to 35 parts:from 5 to 10 parts, by weight relative to the total weight of the fillers present in the total composition.

16. The composition of claim 1, wherein the A-part and the B-part compositions are mixed together to provide a pre-cured, partially cured, or post-cured composition.

17. The composition of claim 16 wherein subsequent to the mixing of the A-part and the B-part compositions and curing of the mixed composition, the composition exhibits any one or more of:

(a) a compression strength in a range of from 15 to 30 kilopound per square inch (ksi), when tested at 24° C. according to ASTM D695;

(b) a compression strength in a range of from 10 to 20 kilopound per square inch (ksi), when tested at 88° C. according to ASTM D695;

(c) a compression modulus in a range of from 1100 to 1700 kilopound per square inch (ksi), when tested at 24° C. according to ASTM D695;

(d) a compression modulus in a range of from 600 to 1200 kilograms per square inch (ksi), when tested at 88° C. according to ASTM D695; or (e) a resistance to thermal cycling as evidenced by little or no cracking visible to the unaided eye after 12 hours of 49° C. condensing humidity, followed by 1 hour @–55° C., followed by 400 thermal cycles between –55° C. and 71° C. at 36 minutes per cycle, and repeat process 5 times for a total of 2,000 cycles.

18. A method comprising delivering the composition claim 1 to an interface between two or more substrates and allowing the composition to cure, the method comprising the steps of:

(a) applying the composition onto a surface of at least one of the two or more substrates;

(b) mating a surface of a second substrate in abutting relationship with the composition-applied first substrate to form an assembly; and (c) maintaining the assembly in the mated abutting relationship for a time sufficient to allow the composition to cure.

19. An assembly comprising a post-cured composition of claim 17, the assembly comprising a rib-to-skin assembly and other load bearing structure of an aircraft part.

20. The composition of claim 1, wherein the at least one di(meth)acrylate is an ethoxylated di(meth)acrylate, wherein a ratio of the least one (meth)acrylic acid and/or (meth)acrylate ester to the ethoxylated di(meth)acrylate is in a range of from 1:3 to 3:1.

* * * * *